United States Patent
Foley et al.

(10) Patent No.: US 10,902,961 B2
(45) Date of Patent: Jan. 26, 2021

(54) INSPECTION TOOL

(71) Applicant: Westinghouse Electric Company LLC, Cranberry Township, PA (US)

(72) Inventors: Kevin J. Foley, Chattanooga, TN (US); Andrew J. Gotliffe, Chattanooga, TN (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 0 days.

(21) Appl. No.: 16/861,073

(22) Filed: Apr. 28, 2020

(65) Prior Publication Data

US 2020/0350086 A1  Nov. 5, 2020

Related U.S. Application Data

(62) Division of application No. 15/681,484, filed on Aug. 21, 2017, now Pat. No. 10,672,526.

(51) Int. Cl.
| | |
|---|---|
| *G21C 17/01* | (2006.01) |
| *G21C 17/013* | (2006.01) |
| *G21C 19/20* | (2006.01) |

(52) U.S. Cl.
CPC ........... *G21C 17/01* (2013.01); *G21C 17/013* (2013.01); *G21C 19/207* (2013.01)

(58) Field of Classification Search
CPC .............................. G21C 17/01; G21C 19/207
See application file for complete search history.

(56) References Cited

U.S. PATENT DOCUMENTS

| | | | | |
|---|---|---|---|---|
| 5,586,155 A | * | 12/1996 | Erbes .................. | G21C 17/003 376/249 |
| 6,525,500 B2 | * | 2/2003 | Hatley ................ | B25J 5/00 318/568.11 |
| 7,769,123 B2 | * | 8/2010 | Rowell ............... | G21C 19/207 376/249 |
| 9,269,463 B2 | * | 2/2016 | Villagomez ......... | G21C 17/007 |

(Continued)

FOREIGN PATENT DOCUMENTS

| | | | | |
|---|---|---|---|---|
| EP | 2907140 B1 | * | 6/2017 | ........... G21C 17/013 |
| EP | 2907140 B1 | | 6/2017 | |
| WO | 2019040386 A2 | | 2/2019 | |

OTHER PUBLICATIONS

International Search Report and Written Opinion for International PCT Application No. PCT/US2018/047128 dated Mar. 13, 2019.

*Primary Examiner* — Lily C Garner
(74) *Attorney, Agent, or Firm* — K&L Gates LLP

(57) ABSTRACT

A tool is receivable into an interior region of a core shroud of a Boiling Water Reactor. The tool includes an elongated frame, an elevator apparatus situated on the frame, and a manipulator apparatus situated on the elevator apparatus. The tool further includes a reciprocation apparatus that is situated on the manipulator apparatus and that has a mount that is structured to carry a device thereon. The reciprocation apparatus includes an elongated rack of an arcuate profile. The elevator apparatus is operable to move the reciprocation apparatus along the longitudinal extent of the frame. The tool further includes a foot apparatus that is situated at an end of the frame and that is receivable on a core plate to enable the frame to be pivoted about an axis of elongation of the frame with respect to the core plate.

6 Claims, 20 Drawing Sheets

(56) References Cited

U.S. PATENT DOCUMENTS

| | | | |
|---|---|---|---|
| 9,437,333 B2* | 9/2016 | Foley | G21C 17/013 |
| 10,192,645 B2* | 1/2019 | Foley | G21C 17/003 |
| 2007/0146480 A1* | 6/2007 | Judge, Jr. | G21C 17/013 |
| | | | 348/83 |
| 2010/0296617 A1* | 11/2010 | Rowell | G21C 19/207 |
| | | | 376/248 |
| 2014/0098922 A1* | 4/2014 | Foley | G21C 17/003 |
| | | | 376/249 |
| 2015/0221401 A1* | 8/2015 | Foley | G21C 17/017 |
| | | | 376/249 |
| 2019/0131022 A1* | 5/2019 | Foley | G21C 17/00 |

* cited by examiner

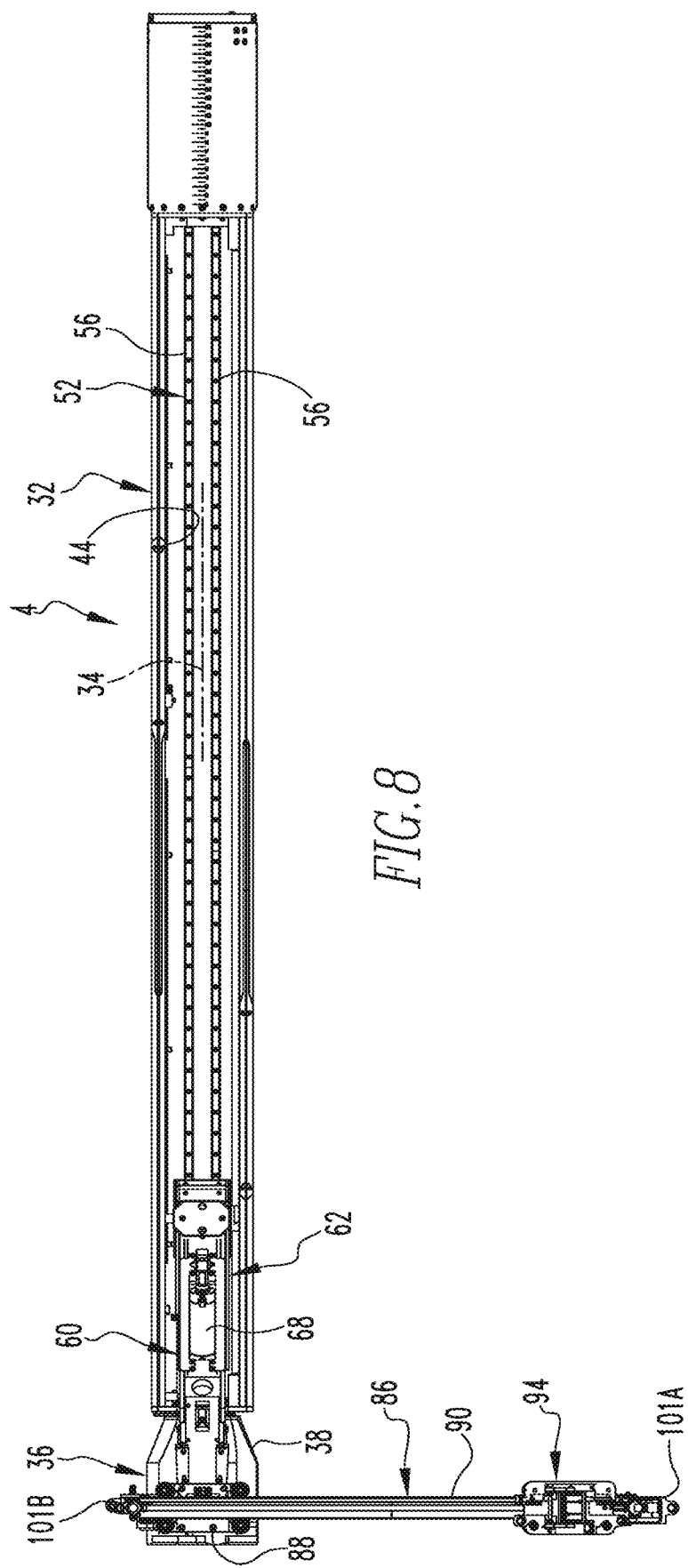

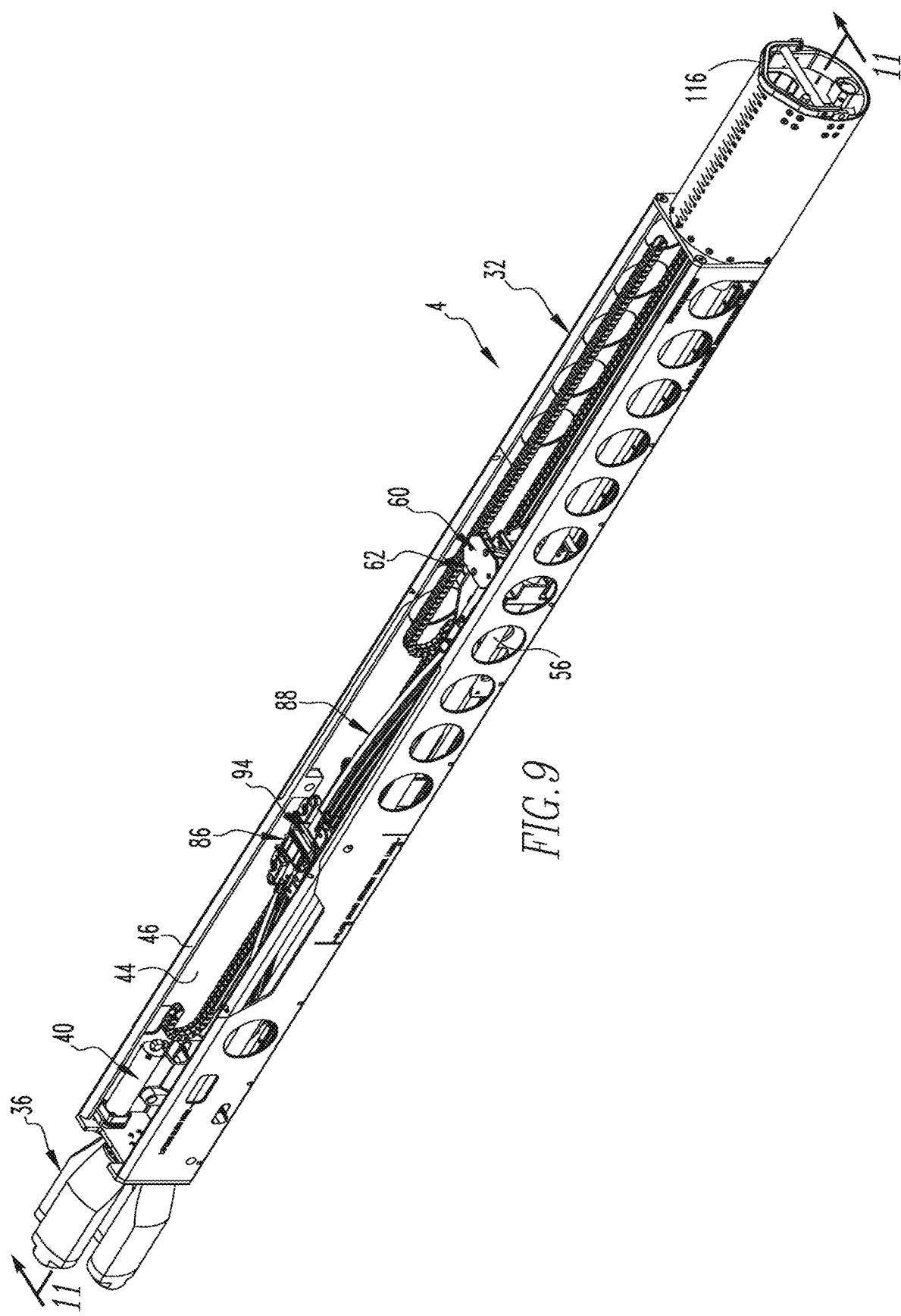

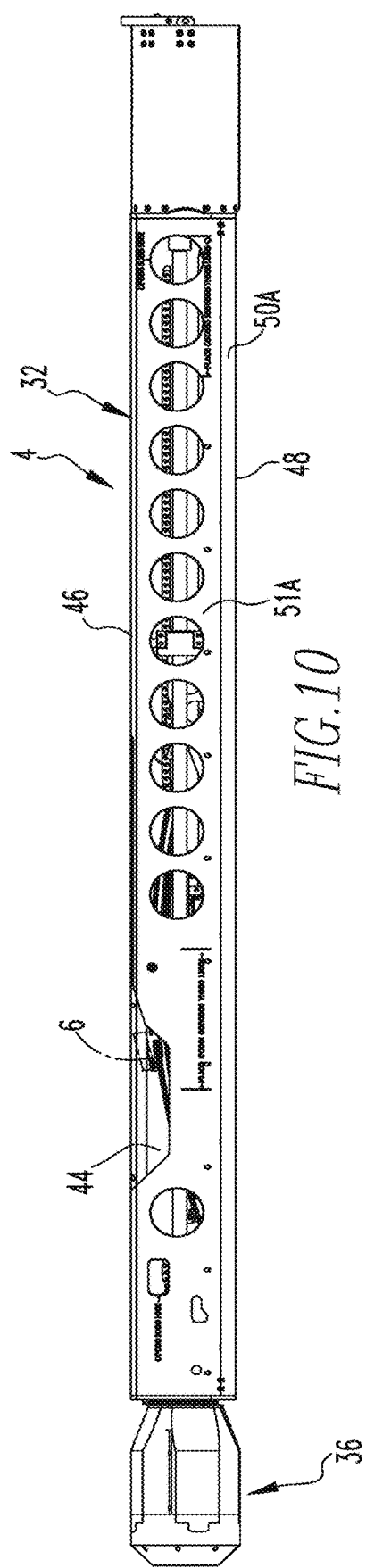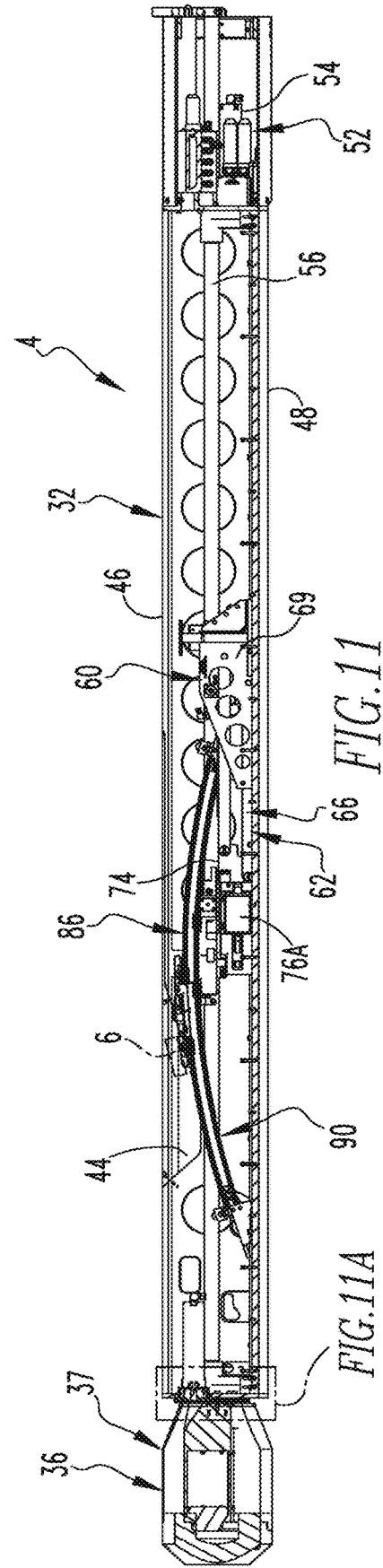

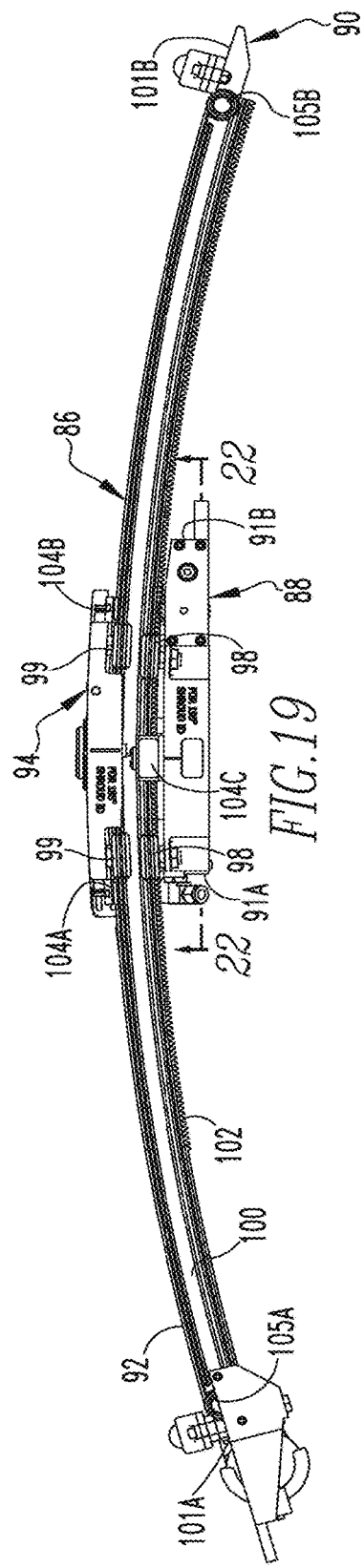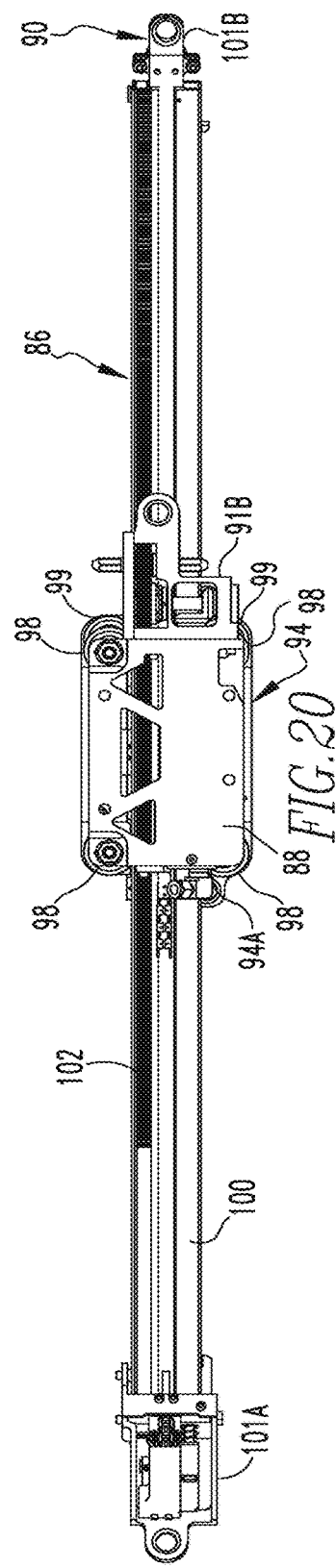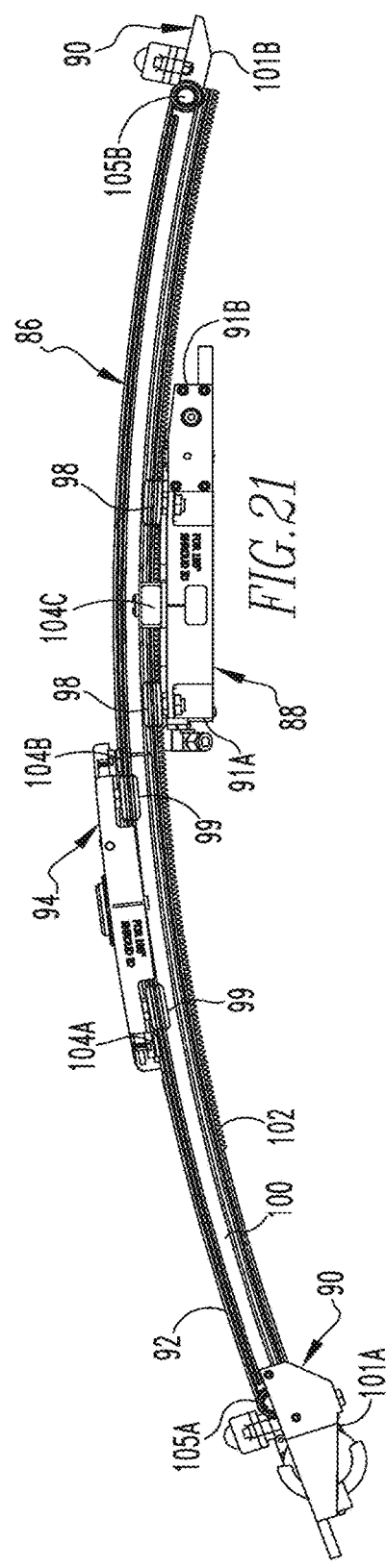

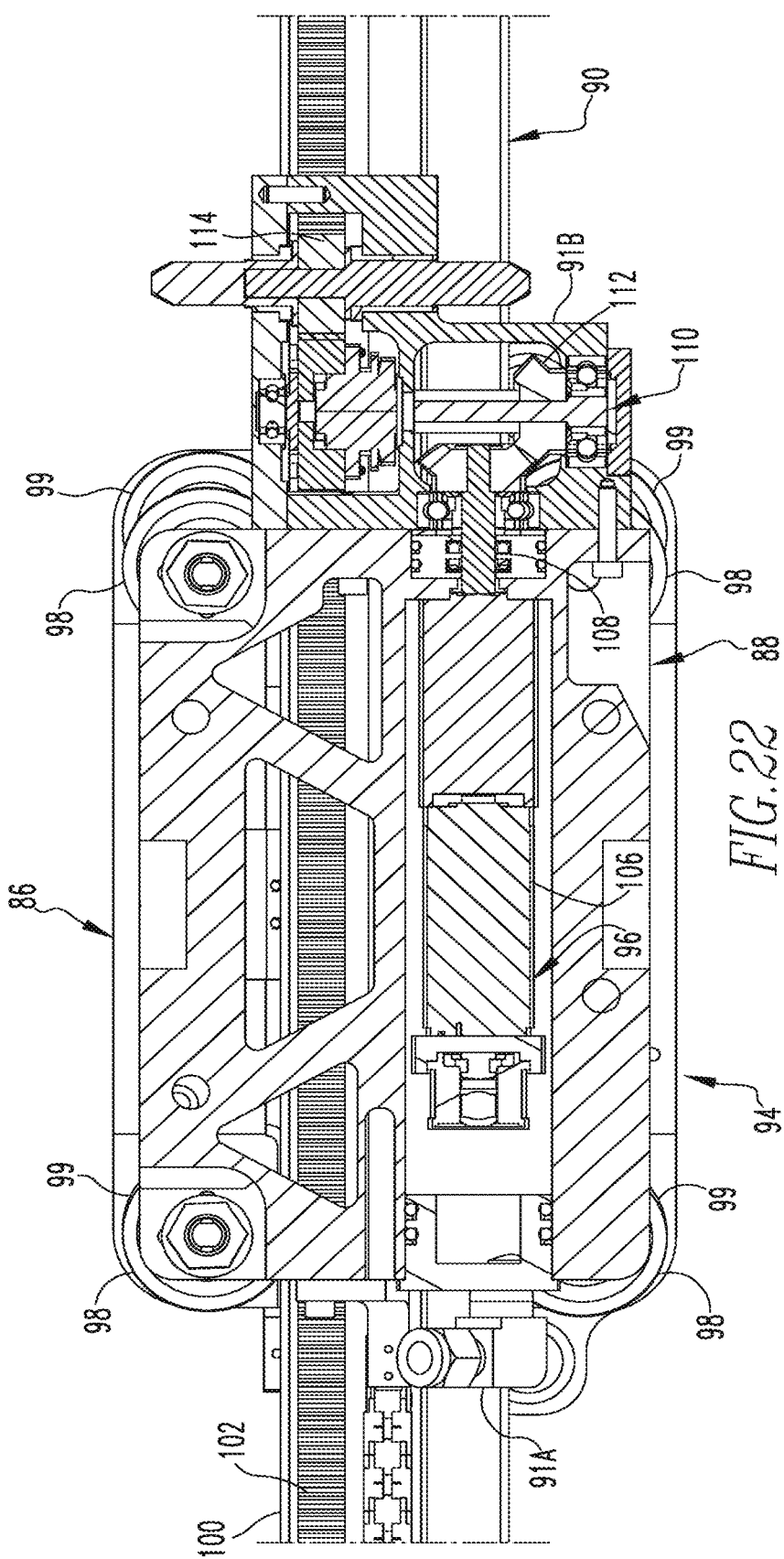

INSPECTION TOOL

This application is a divisional application claiming priority under 35 U.S.C. § 121 to U.S. patent application Ser. No. 15/681,484, entitled INSPECTION TOOL, filed Aug. 21, 2017, which issued as U.S. Pat. No. 10,672,526 on Jun. 2, 2020, the entire disclosure of which is hereby incorporated by reference herein.

BACKGROUND

1. Field

The disclosed and claimed concept relates generally to a tool that is usable in an irradiated environment and, more particularly, to a tool that is usable to be received into an interior region of a core shroud of a boiling water reactor and that is structured to carry a device thereon into the interior region.

2. Related Art

Numerous types of nuclear reactors are known to exist in the relevant art. Such known nuclear reactors can be said to include pressurized water reactors (PWRs) and boiling water reactors (BWRs), each of which typically is connected with an electrical generator as part of a nuclear power plant.

Various components and structures in a nuclear reactor are examined periodically to assess the structural integrity of such components and structures and to indicate the need for repair. Ultrasonic inspection is a known technique for detecting cracks in nuclear reactor components and structures. However, the inspection areas in a nuclear reactor may have limited access and therefore may be difficult to assess using an inspection tool. For example, the reactor core shrouds of BWRs are periodically assessed for cracking inasmuch as the presence of cracking can diminish the structural integrity of the core shroud and can disrupt plant operations. However, the core shroud welds are difficult to access. More specifically, access to such a core shroud at the outer cylindrical surface is typically limited to the annular space between the outer surface of the core shroud and the inner surface of a reactor pressure vessel in areas between adjacent jet pumps. Access for purposes of ultrasonic scanning is further restricted within the narrow space between the inner surface of the reactor pressure vessel and the jet pumps and other attachments such as the riser brace or restrainer brackets that protrude radially outwardly from the cylindrical outer surface of the core shroud. Furthermore, and depending upon the specific plant installation, some core shrouds and welded attachments may be entirely inaccessible at the exterior surface of the core shroud.

It is further noted that the inspection areas in a nuclear reactor can be highly radioactive and can pose safety risks for personnel working in these areas. The inspection and repairing of nuclear reactors, such as BWRs, typically consists of operating manually-controlled poles and ropes to manipulate and/or position the inspection devices. During a reactor shutdown, the servicing of some components requires the installation of inspection manipulation devices 30 to 100 feet deep within the reactor coolant. Relatively long durations are required to install or remove manipulators at such depths, which can impact the duration of the plant shutdown. In addition, different inspection devices can require several different manipulators or reconfigurations of manipulators in order to perform an inspection, which requires additional manipulator installations and removals, and thus added cost. The long durations impact not only plant shutdown durations but also have the effect of increasing the radiation and contamination exposure to personnel performing the inspection operations.

Plant utilities thus have a desire to reduce the number of manipulator installations and removals in order to reduce the radiological exposure as well as the cost and impact of plant outages. Furthermore, plant utilities have a desire to reduce cost and to operate as productively as possible. Improvements thus would be desirable.

SUMMARY

An improved tool is configured to be received into an interior region of a core shroud of a BWR. The tool is structured to carry thereon a device into the interior region. The device can be a test instrument that is capable of performing an ultrasonic scanning operation on the core shroud, or it can be another device. The tool includes an elongated frame, an elevator apparatus situated on the frame, and a manipulator apparatus situated on the elevator apparatus. The tool further includes a reciprocation apparatus that is situated on the manipulator apparatus and that has a mount that is structured to carry the device thereon. The reciprocation apparatus includes an elongated rack of an arcuate profile that matches the profile of the inner surface of the core shroud. Movement of the elongated rack with respect to the manipulator apparatus causes a mount that is situated on the rack and the device that is carried on the mount to move along an arcuate path to inspect the core shroud along a circumferential direction. The elevator apparatus is operable to move the reciprocation apparatus along the longitudinal extent of the frame in order to move the mount and the device carried thereon along an axial direction on the core shroud. The manipulator apparatus is operable to move the reciprocation apparatus between a retracted position received in an elongated receptacle formed on the frame and a deployed position wherein the reciprocation apparatus is removed from the receptacle and the device is therefore deployed for inspection purposes. In the retracted position, the tool is receivable through an opening in a top guide of the BWR and into a fuel cell from which the nuclear fuel has been removed. The tool further includes a foot apparatus that is situated at an end of the frame and that is receivable on a core plate to enable the frame to be pivoted about an axis of elongation of the frame with respect to the core plate.

Accordingly, an aspect of the disclosed and claimed concept is to provide an improved tool that is structured to be received in an interior region of a core shroud of a BWR and that is structured to carry an inspection device or other device thereon into the interior region.

Another aspect of the disclosed and claimed concept is to provide an improved tool that can be received through an opening in the top guide and into a fuel cell of the BWR from which the nuclear fuel has been removed.

Another aspect of the disclosed and claimed concept is to provide an improved tool having a reciprocation apparatus that is operable to move a device that is situated on a mount along an arcuate path along an interior surface of the core shroud of the BWR.

Another aspect of the disclosed and claimed concept is to provide a reciprocation apparatus that is receivable on such a tool and that is adapted to enable movement of a device that is situated on a mount of a reciprocation apparatus along an arcuate path.

Another aspect of the disclosed and claimed concept is to provide an improved tool having a manipulator apparatus that is mountable on an elevator apparatus in either of a pair of configurations, in one configuration the manipulator apparatus extending from the elevator apparatus in a direction generally toward the foot apparatus, and in a second configuration the manipulator apparatus extending from the elevator apparatus in a direction generally away from the foot apparatus.

These and other aspects of the disclosed and claimed concept are provided by an improved tool that is structured to be received into an interior region of a core shroud of a boiling water reactor and that is structured to carry a device thereon into the interior region. The tool can be generally described as including a frame, the frame being elongated along an axis of elongation and having a receptacle formed therein that is elongated along the axis of elongation, an elevator apparatus situated on the frame, a manipulator apparatus situated on the elevator apparatus, at least a portion of the manipulator apparatus being situated in the receptacle, a reciprocation apparatus that can be generally described as including a support that is elongated and that is situated on the manipulator apparatus, the reciprocation apparatus further can be generally described as including a mount that is situated on the support and that is structured to carry the device, the elevator apparatus being operable to move the manipulator apparatus between a first position and a second position along the longitudinal extent of the frame, the manipulator apparatus being operable to move the reciprocation apparatus between a first position wherein the support is disposed at least in part in the receptacle and a second position wherein the support and the mount are removed from the receptacle, and a foot apparatus situated on the frame and that can be generally described as including a number of feet and a pivot mechanism, the number of feet being situated at an end of the frame and being structured to be received on at least one of a fuel support, a control rod guide tube, and a core plate of the boiling water reactor, the pivot mechanism being structured to pivot the frame about the axis of elongation with respect to the number of feet when the number of feet are received on the at least one of the fuel support, the control rod guide tube, and the core plate.

Other aspects of the disclosed and claimed concept are provided by an improved reciprocation apparatus that is structured to be mounted to a tool which is receivable into an interior region of a core shroud of a boiling water reactor, the reciprocation apparatus further being structured to carry a device thereon into the interior region. The reciprocation apparatus can be generally stated as including a platform that is structured to be situated on the tool and that has a first side and a second side opposite one another, a support that is elongated and that is situated on the platform, the support having a first end and a second end opposite one another, the support being movable along its direction of elongation with respect to the platform in a first direction wherein the first end moves relatively farther away from the first side, the support further being movable in a second direction opposite the first direction wherein the second end moves relatively farther away from the second side, a belt that is elongated and flexible, the belt being affixed at one or more locations along its length to the platform to form a closed loop that extends about at least a portion of the support and that permits relative movement between the belt and the at least portion of the support when the support moves in the first and second directions, a mount that is situated on the belt and that is structured to carry the device, a drive mechanism operationally extending between the support and one of the platform and the belt, the drive mechanism being operable to move the reciprocation apparatus between a first state of the reciprocation apparatus and a second state of the reciprocation apparatus, in the first state, a relatively greater portion of the support extends from the first side than extends from the second side, and the mount is situated relatively closer to the first end than the second end, and in the second state, a relatively greater portion of the support extends from the second side than extends from the first side, and the mount is situated relatively closer to the second end than the first end.

BRIEF DESCRIPTION OF THE DRAWINGS

A further understanding of the disclosed and claimed concept can be gained from the following Description when read in conjunction with the accompanying drawings in which:

FIG. 8 is a view similar to FIG. 6, except depicting a front view of the tool;

FIG. 9 is a view similar to FIG. 5, except depicting the manipulator apparatus in a retracted position wherein a support of the reciprocation apparatus is situated within an elongated receptacle of the frame;

FIG. 10 is a view similar to FIG. 9, except depicting a side view of the tool;

FIG. 11 is a sectional view as taken along line 11-11 of FIG. 9;

FIG. 19 is a top plan view of the reciprocation apparatus of FIG. 1;

FIG. 20 is a rear elevational view of the reciprocation apparatus of FIG. 19;

FIG. 21 is a view similar to FIG. 19, except depicting the reciprocation apparatus in another position; and FIG. 22 is a sectional view as taken along line 22-22 of FIG. 19.

Similar numerals refer to similar parts throughout the specification.

DESCRIPTION

Figure 1:
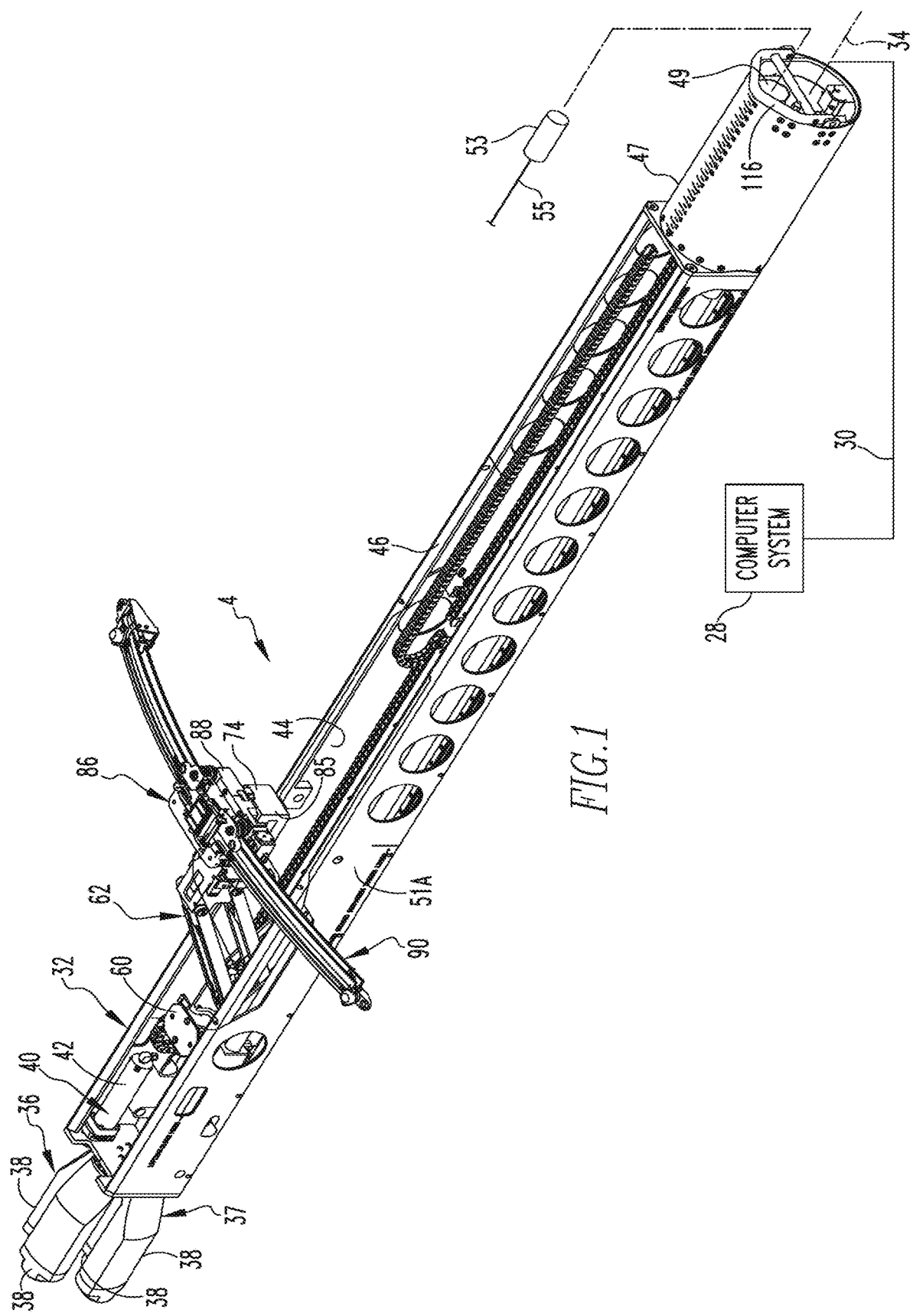
FIG. 1 is a perspective view of an improved tool in accordance with a first aspect of the disclosed and claimed concept having situated thereon a manipulator apparatus that is situated in a first configuration on the tool, and further showing an improved reciprocation apparatus in accordance with another aspect of the disclosed and claimed concept situated on the manipulator apparatus in a centered position.
Figure 2:
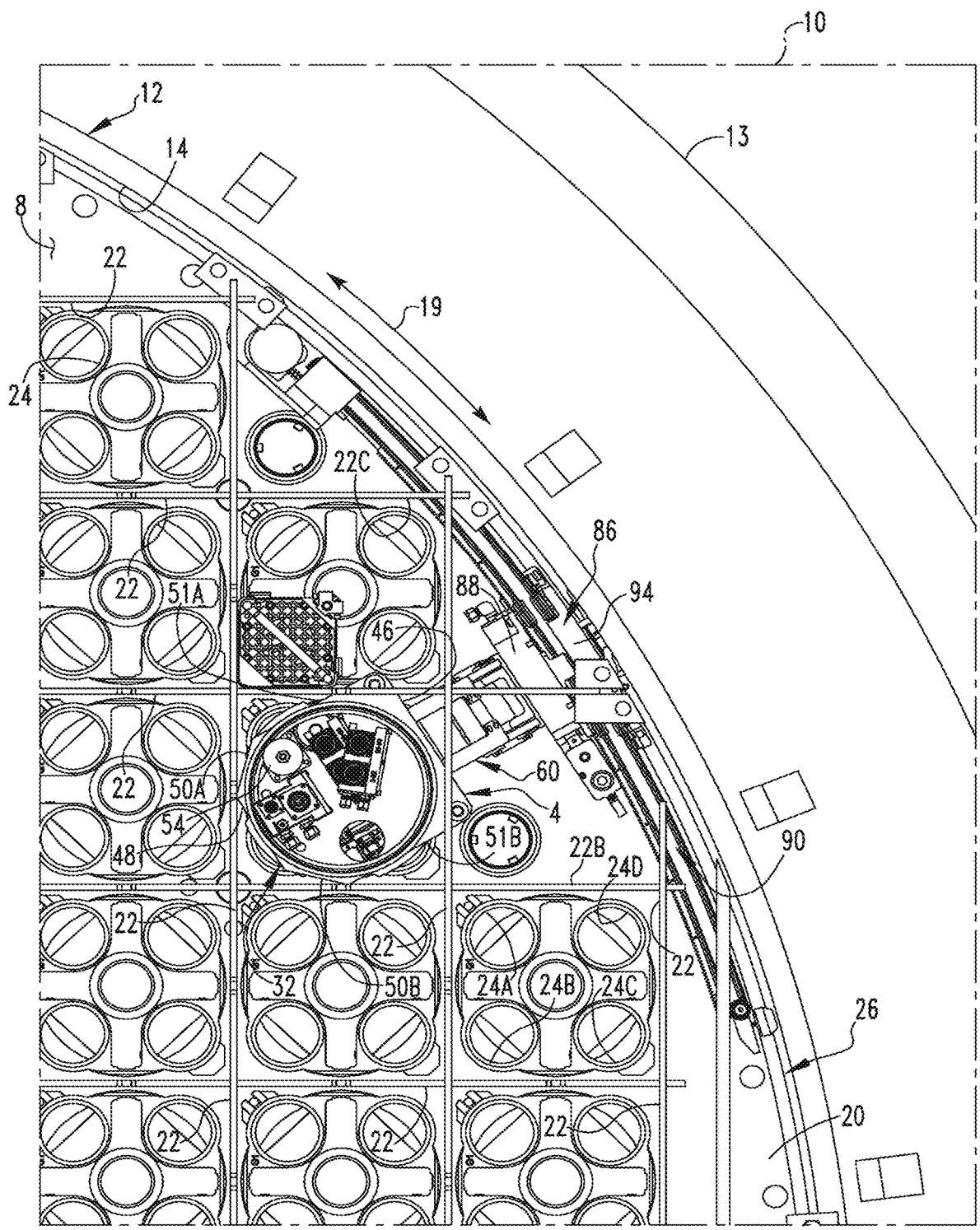
FIG. 2 is a top plan view of the tool of FIG. 1 as seen through a top guide of a boiling water reactor and situated in a fuel cell and disposed on a core plate of the boiling water reactor.

An improved tool 4 in accordance with an aspect of the disclosed and claimed concept is depicted generally in FIGS. 1-12 and is depicted in part in FIGS. 13-22. The tool 4 is configured to carry a device 6 (FIG. 7) thereon into an interior region 8 of a nuclear reactor such as a boiling water reactor (BWR) 10, as is depicted in FIG. 2. The device 6 may be, for example, an ultrasonic testing device or other such testing or evaluation device, or it alternatively might be some type of a device that physically interacts with an object at the interior region 8, such as a device that grasps or moves an object within the interior region 8, by way of example and without limitation.

As can be seen in FIG. 2, the BWR 10 includes an annular shroud 12 that is situated within the interior region of a reactor pressure vessel 15. The shroud 12 has an interior surface 14 that faces away from the reactor pressure vessel 13 and that is the surface of the shroud 12 at which an inspection of the shroud 12 can be conducted with the use of the tool 4, such as if the device 6 is an ultrasonic sensor. As can be understood from FIG. 4, the shroud 12 has a number of welds formed therein that include a vertical weld 16 and a horizontal weld 18. As employed herein, the expression "a number of" and variations thereof shall refer broadly to any non-zero quantity, including a quantity of one. The vertical weld 16 can be said to extend along an axial direction 17 of the shroud 12, and the horizontal weld 18 can be said to lie along a circumferential direction 19 which can also be referred to herein as an azimuthal direction.

As can be understood from FIG. 2, the BWR 10 further includes a core plate 20 upon which the tool 4 can be situated and a top guide 26 that is spaced vertically above the core plate 20. The BWR 10 has a plurality of fuel cells 22 formed therein that each include an opening formed in the top guide 26, and each of which is structured to have nuclear fuel situated therein when the BWR 10 is in operation. Furthermore, it is noted that the BWR 10 is depicted herein, i.e., in FIGS. 2 and 4, as having all of the fuel removed therefrom for purposes of simplicity of depiction. It is also expressly noted that the tool 4 is designed to be used in conjunction with the BWR 10 without the need to remove all of the fuel and other materials from the fuel cells 22. That is, the tool 4 is advantageously configured to be received in a fuel cell 22 after the fuel has been removed therefrom, but with a minimal need to remove fuel from the fuel cells 22 adjacent thereto. For example, FIG. 2 depicts the tool 4 being received in a fuel cell 22A of the plurality of fuel cells 22. FIG. 2 also depicts the tool 4 being pivoted (in a fashion that will be described in greater detail below) such that a portion thereof protrudes into an adjacent fuel cell 22B and into an adjacent region 22C that does not actually receive fuel therein. As such, it can be understood that the other fuel cells 22 that are depicted in FIG. 2 as being without fuel and the like need not have their fuel and the like removed therefrom in order to receive the tool 4 in the fuel cell 22A and have it perform an inspection on the interior surface 14 in the vicinity of the fuel cells 22A and 22B, and in such circumstances it is necessary only to remove the fuel from the fuel cells 22A and 22B. This advantageously reduces the time and effort required to perform an inspection on the interior surface 14 of the shroud 12 by limiting the amount of fuel that must be removed from the fuel cells 22 in order to perform the inspection operation on the interior surface 14 of the shroud 12.

As can further be seen in FIG. 2, the core plate 20 has a plurality of sockets formed therein that are indicated generally at the numerals 24A, 24B, 24C, and 24D, and which can be collectively or individually referred to herein with the numeral 24. Each fuel cell 22 has a set of sockets 24A, 24B, 24C, and 24D that are configured to receive therein a cooperating structure of the tool 4 that will be described in greater detail below. When the BWR 10 is in operation, the receptacles 24 accept the reactor fuel support casting and various fuel lattice structures. It thus can be understood that when the BWR 10 is to be inspected or to have an operation performed thereon with the tool 4, one of the fuel cells 22 that is situated nearby the interior surface 8 will need its fuel removed therefrom in order to receive the tool 4 therein. The fuel that is in one or two additional fuel cells 22 that are adjacent the fuel cell 22 that is to receive the tool 4 may need to be removed in order to permit maneuvering of the tool 4 as will be described below.

As can be understood from FIG. 1, the tool 4 is connected with a computer system 28 via an umbilical 30. The computer system 28 includes an input apparatus that can include various input devices such as a keyboard, joystick, and other control input devices. The computer system 28 further includes an output apparatus that can include various output devices such as a visual display, a printer, an audible output system such as a loudspeaker, and the like without limitation. The computer system 28 additionally includes a processor apparatus that is in communication with the input apparatus and the output apparatus and which has various routines executable thereon to cause the tool 4 to perform various operations. It is to be understood that the tool 4 and its various subassemblies are robotic in nature, meaning that they include actuators that are operated electronically via electric motors or via pneumatically-operated motors or cylinders, or the like. As such, it is understood that the umbilical 30 can include not only electronic communication channels in the form of wires and the like, but can also include air or other fluid channels that convey fluid to the tool 4 in order to actuate certain subassemblies thereof. In this regard, it is understood that the computer system 28 may communicate wirelessly with the tool 4 without departing from the spirit of the instant disclosure.

The tool 4 can be said to include an elongated frame 32 that is elongated along an axis of elongation 34. The tool 4 further includes a foot apparatus 36 that is situated at an end of the frame 32 and which includes a foot assembly 37 having set of four feet 38 that are configured to be received in the sockets 28A, 28B, 28C, and 28D of a fuel cell 22 in which the tool 4 is received. In this regard, it is understood that the feet 38 can be received on any of a variety of parts of the BWR 10, such as any one or more of a fuel support, a control rod guide tube, or the core plate 20 of the BWR 10, by way of example. The fuel support is a piece of reactor hardware that sits on the top of a control rod guide tube. The top of the control rod guide tube protrudes slightly through the top of the core plate 20 and supports the weight of the fuel support. The feet 38 can be reconfigured as needed to permit installation of the tool 4 into a guide tube or on the core plate 20, by way of example, if the customer has the control rod guide tube and/or the fuel support removed.

Figure 11A:
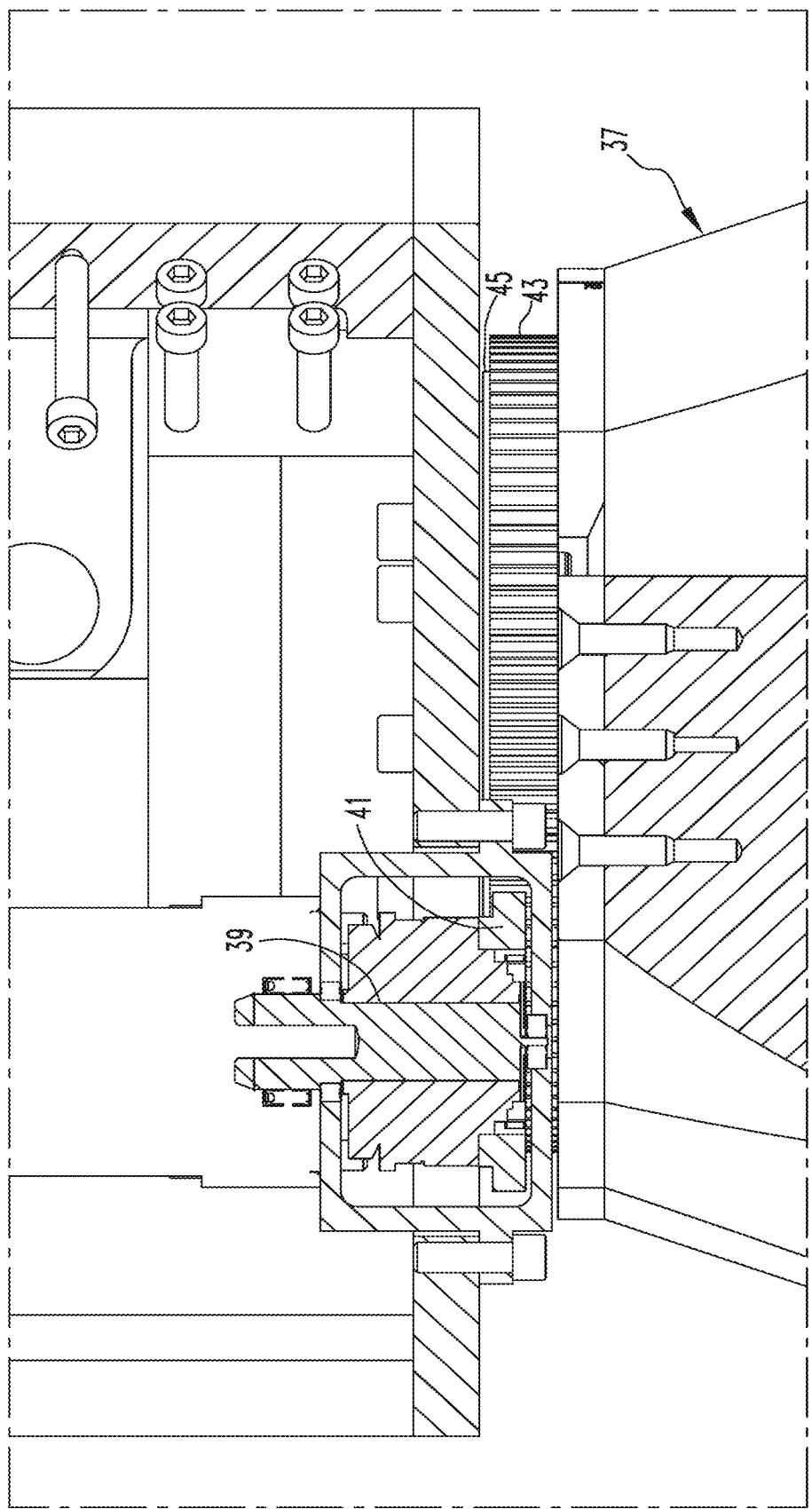
FIG. 11A is an enlargement of an indicated portion of FIG. 11.
Figure 12:
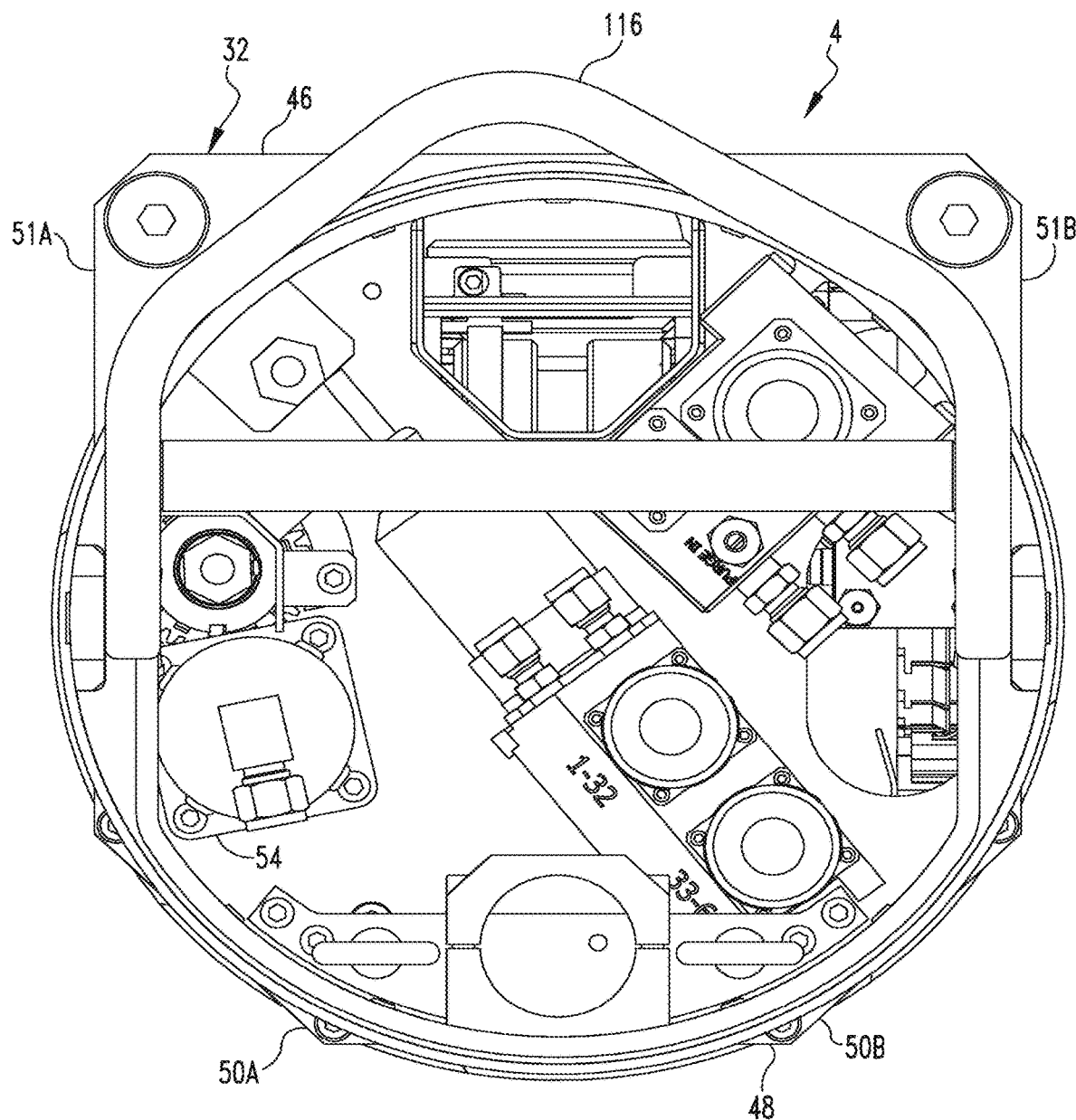
FIG. 12 is a view similar to FIG. 9, except depicting a top plan view of the tool.

The foot apparatus 36 further includes a pivot mechanism 40 that causes the frame 32 to pivot with respect to the feet 38 about an axis of rotation which, in the depicted exemplary embodiment, is coincident with the axis of elongation 34. In this regard, the pivot mechanism 40 includes a motor 42 that is connected via gears between the frame 32 and the feet 38, and which can be energized or otherwise actuated to operate the pivot mechanism 40 to pivot the frame 32 about its axis of elongation 34 with respect to the feet 38. More specifically, and as is shown in FIG. 11A, the motor 42 includes a shaft 39 and further includes a pinion gear 41 situated on the shaft 39. The foot assembly 37 further includes situated thereon a reaction gear 43 that is engaged by the pinion gear 41 to pivot the frame 32 about its axis of elongation 34 with respect to the feet 38 when the motor 42 is energized or is otherwise actuated. A bearing 45 is interposed between the end of the frame 32 and the foot assembly 37 in order to reduce friction therebetween when the frame 32 is being pivoted with respect to the feet 38. In the depicted exemplary embodiment, the bearing 45 is a deep groove ball bearing, but it is understood that other types of bearings can be employed without departing from the spirit of the instant disclosure.

As can be seen in FIG. 1, for example, the frame 32 has an elongated receptacle 44 formed into what can be characterized as a frontal face 46 of the frame 32. The receptacle 44 is elongated along the axis of elongation 34. The frame 32 can be said to additionally include a rear face 48 (FIG. 2) opposite the frontal face 46, and to further include a pair of chamfers 50A and 50B that are formed in the frame 32 and that extend between the rear face 48 and the pair of lateral surfaces 51A and 51B, respectively. As can be understood from FIG. 2, the chamfers 50A and 50B, which may be collectively or individually referred to herein with the numeral 50, provide clearance between the frame 32 and the fuel cell 22 that is situated adjacent the fuel cell 22 where the tool 4 is situated. Such clearance enables the pivot mechanism 40 to pivot the frame 32 with respect to the core plate 20 without a meaningful risk of striking or otherwise engaging the fuel that is situated in such adjacent fuel cell 22. It is noted that the chamfers 50 can be of different configurations and profiles, such as rounded radii or otherwise arcuate, or can be of other angles with respect to the rear face 48 and the lateral surfaces 51A and 51B without departing from the spirit of the instant disclosure.

As can be understood from FIGS. 1 and 2, by way of example, the frame 32 includes a head 47 at an end thereof opposite the foot apparatus 36. The head 47 is of a round shape within a plane oriented transverse to the axis of elongation 34. The head 47 has formed therein an access port 49 that can receive therein another device such as a camera 53. The camera 53 would typically be connected via a cable 55 with a video system, and the cable 55 may be a part of the umbilical 30. By providing the pivot mechanism 40 at the bottom end of the tool 4 rather than at the top end of the tool 4 the head 47, the head 47 has sufficient free space inside that it can advantageously have the access port 49 formed therein, which permits the camera 53 or other device to be received into the access port 49. The access port 49 provides access into the receptacle 44, which enables access between the receptacle 44 and, for instance, the region that is situated vertically above the tool 4. For instance, the camera 53 can be received through the access port 49 into the receptacle 44 in order to remotely observe the operations of the device 6 and the functioning of the tool 4.

Further advantageously, by providing the pivot mechanism 40 to be situated between the foot assembly 37 and the frame 44 and to thus pivot the entire frame 44 with respect to the feet 38, the pivoting of the frame 44 about axis of elongation 34 can cause the umbilical 30 to move within the water that is situated in the BWR 10. That is, in certain situations such as the removal of fuel from a fuel cell 22, the narrow confines of the BWR may result in a physical conflict between the umbilical 30 and the fuel that is being removed, by way of example. The pivot mechanism 40 thus can be advantageously operated to pivot the frame 44 and thus to thereby reposition the umbilical 30 within the water of the BWR 10, thus resolving the conflict between the umbilical 30 and the fuel being removed and therefore advantageously avoiding physical contact between them.

Figure 16:
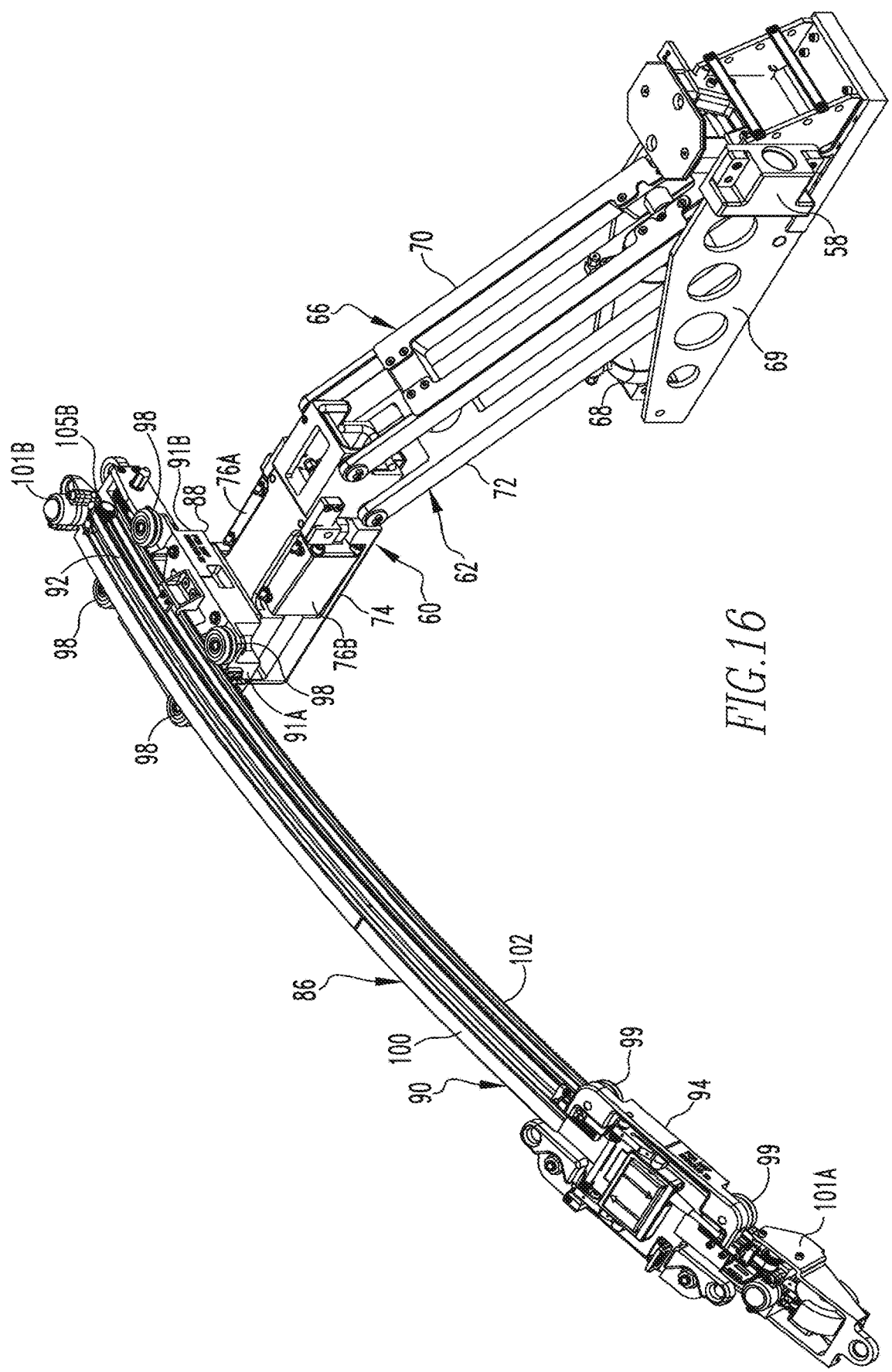
FIG. 16 is a perspective view of the manipulator apparatus and the reciprocation apparatus in a position similar to that depicted in FIG. 5.

The tool 4 further includes an elevator apparatus 52 that is depicted in FIG. 11 as being situated on the frame 32 and including a drive motor 54 and a drive screw 56. The drive screw 56 is cooperable with a follower 58 (FIG. 16). The drive motor 54 is operatively connected with the drive screw 56, which is in the form of a jack screw or other type of threaded elongated device, and which is threadably connected with the follower 58. As can be seen in FIG. 16, the follower 58 is affixed to a manipulator apparatus 60. As can be understood from FIGS. 8, 10, and 11, when the drive motor 54 is energized, or is otherwise caused to operate, the drive screw 56 is caused to rotate within the receptacle 44 and to threadably engage the follower 58, which causes the follower 58 and the manipulator apparatus 60 to be translated along the axis of elongation 34 of the frame 32. For example, the position of the manipulator apparatus 60 in FIG. 1 with respect to the frame 32 is different than the position of the manipulator apparatus 60 in FIG. 3 with respect to the frame 32. Such a translation of the manipulator apparatus 60 along the axis of elongation 34 results from the drive motor 54 of the elevator apparatus 52 having been energized or otherwise caused to operate the drive screw 56 in order to threadably engage the follower 58 and to translate the manipulator apparatus 60 within the receptacle 44 along the axis of elongation 34.

As can be understood from FIGS. 1 and 16, by way of example, the manipulator apparatus 60 can be said to include an extension apparatus 62 and a rotation apparatus 64 that are connected with one another. The extension apparatus 62 is situated on the elevator apparatus 52, and the rotation apparatus 64 is situated on the extension apparatus 62.

The extension apparatus 62 can be said to include a four bar linkage 66 and a driver 68. As can best be seen in FIG. 16, the four bar linkage 66 can be said to include a stand 69 upon which the follower 58 is situated, a first link 70 and a second link 72 that are pivotably connected with the stand 69 and that each extend away therefrom, and a body 74 that is pivotably connected with the ends of the first and second links 70 and 72 opposite the stand 69. The stand 69, the first and second links 70 and 72, and the body 74 together function as a four bar linkage, which is the four bar linkage 66.

Figure 3:
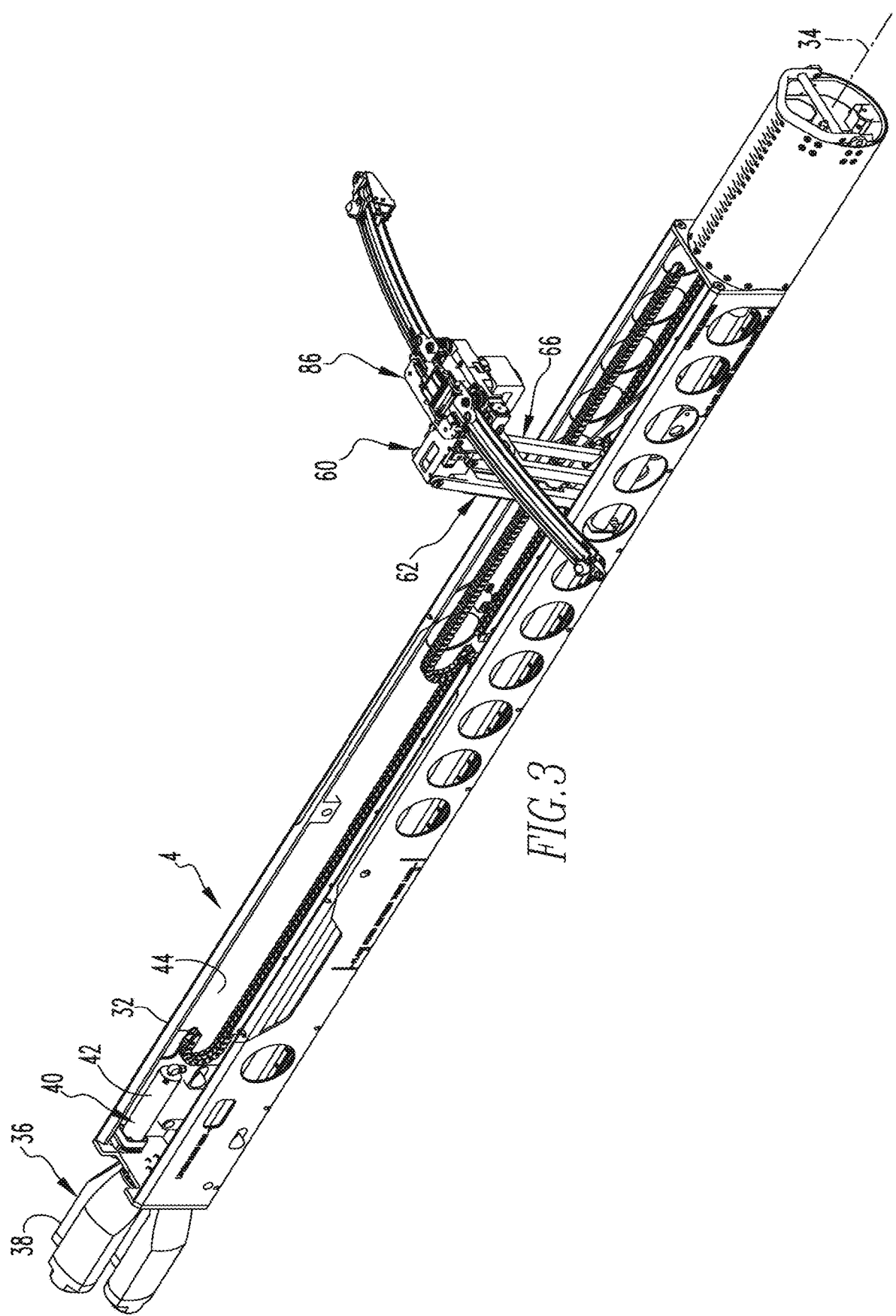
FIG. 3 is a view similar to FIG. 1, except depicting the manipulator apparatus positioned at a different location along the longitudinal extent of the tool.
Figure 5:
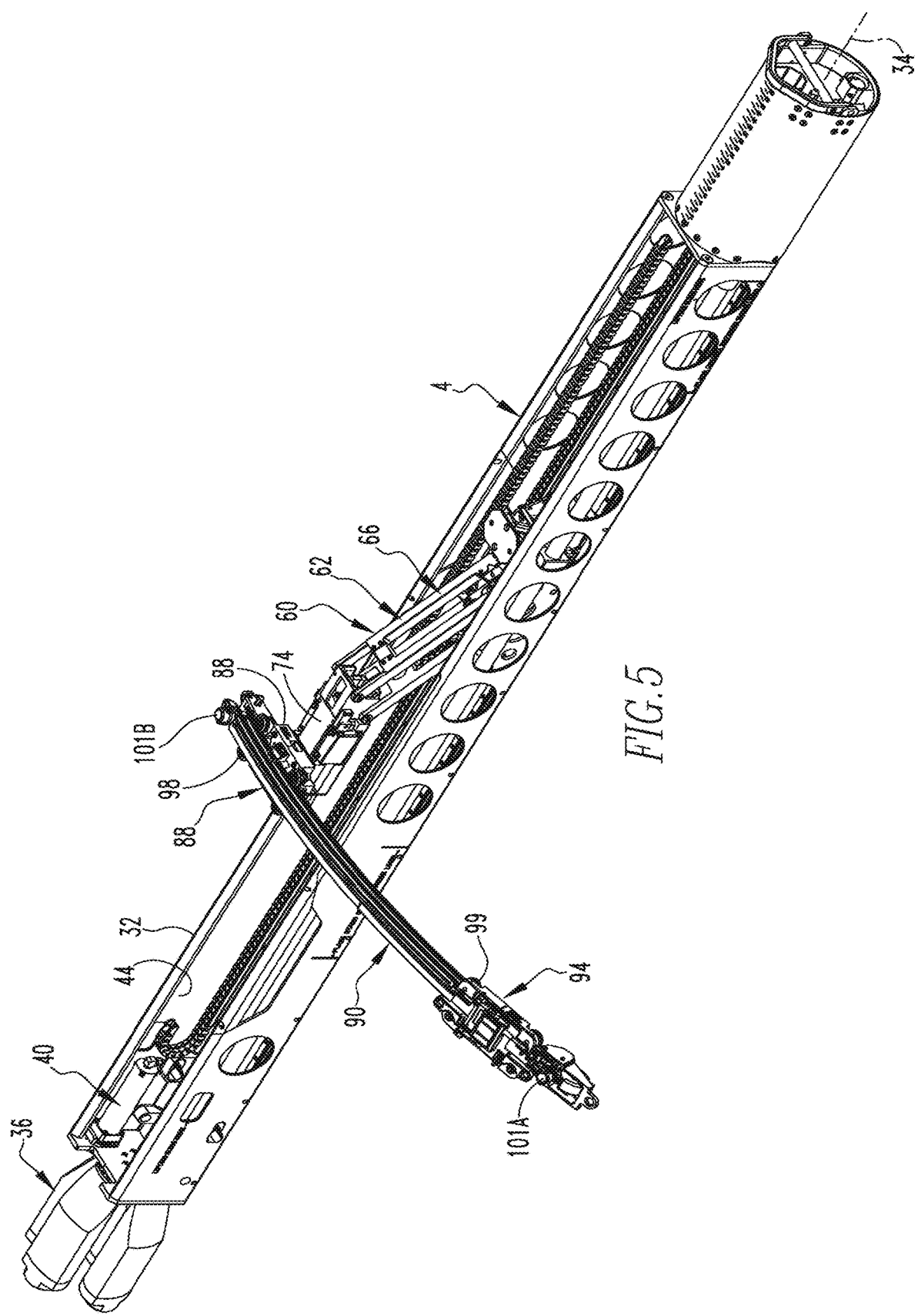
FIG. 5 is a view similar to FIG. 1, except depicting the manipulator apparatus in the second configuration and further depicting the reciprocation apparatus in a different, non-centered position.
Figure 17:
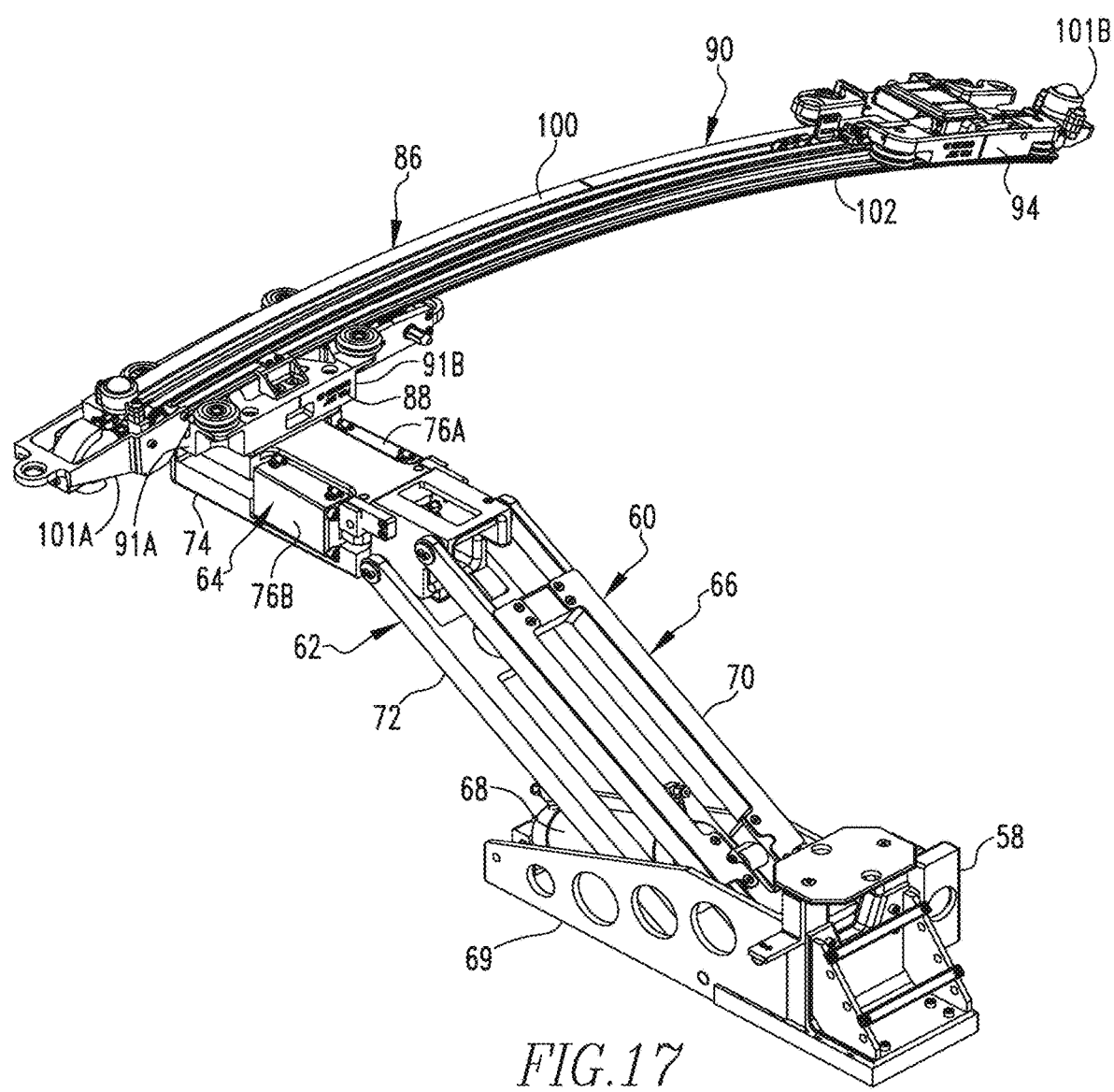
FIG. 17 is a view similar to FIG. 16, except depicting the reciprocation apparatus in a different position with respect to the manipulator apparatus.
Figure 18:
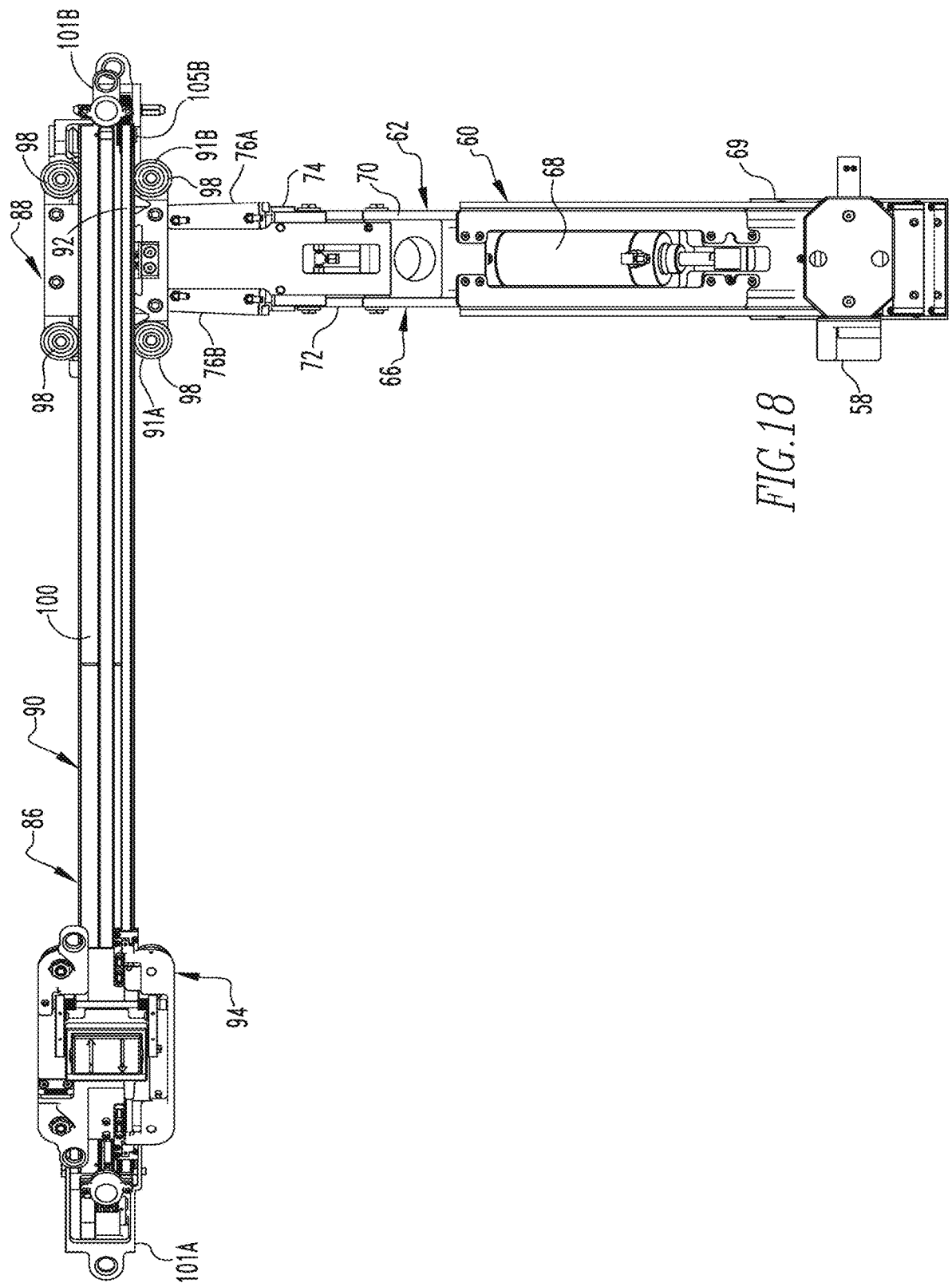
FIG. 18 is a view similar to FIG. 16, except depicting a front view of the manipulator apparatus and the reciprocation apparatus.

It can be understood from FIGS. 16-18 that the driver 68 operatively extends between the stand 69 and the first link 70. The driver 68 can be any of a wide variety of devices such as pneumatic cylinders, stepper motors, and other such devices that are configured to have a variable length and to thereby operate the four bar linkage 66 between a retracted position, such as is depicted generally in FIGS. 9-12 and an extended position such as is depicted generally in FIGS. 1, 3, and 5, by way of example. As will be set forth in greater detail below, the four bar linkage 66 is situated in the retracted position of FIGS. 9-12, by way of example, when the tool 4 is being received in the fuel cell 22 and being removed therefrom, whereas the extension apparatus 62 is typically in an extended position, some examples of which are depicted in FIGS. 1, 3, and 5, when an inspection operation or other operation is being performed by the tool 4 situated in the fuel cell 22.

Figure 13:
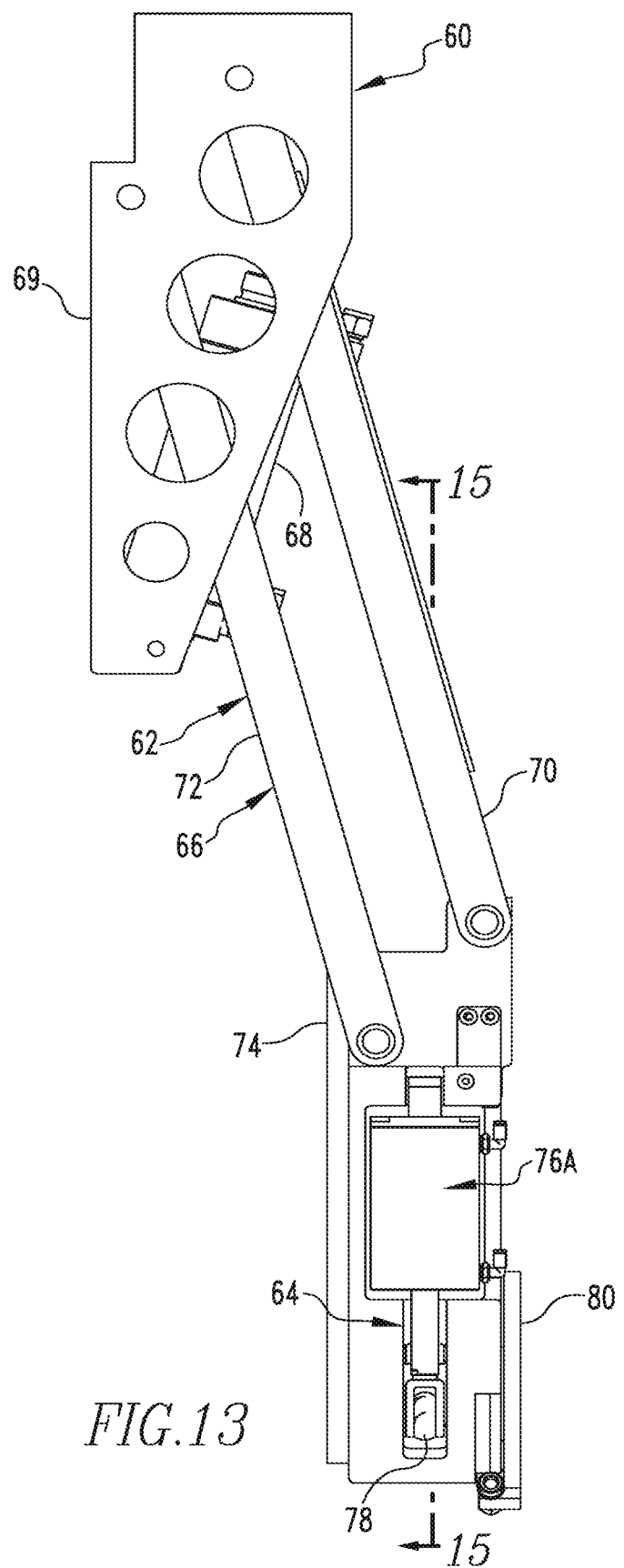
FIG. 13 is a side elevational view of the manipulator apparatus of the tool of FIG. 1.
Figure 14:
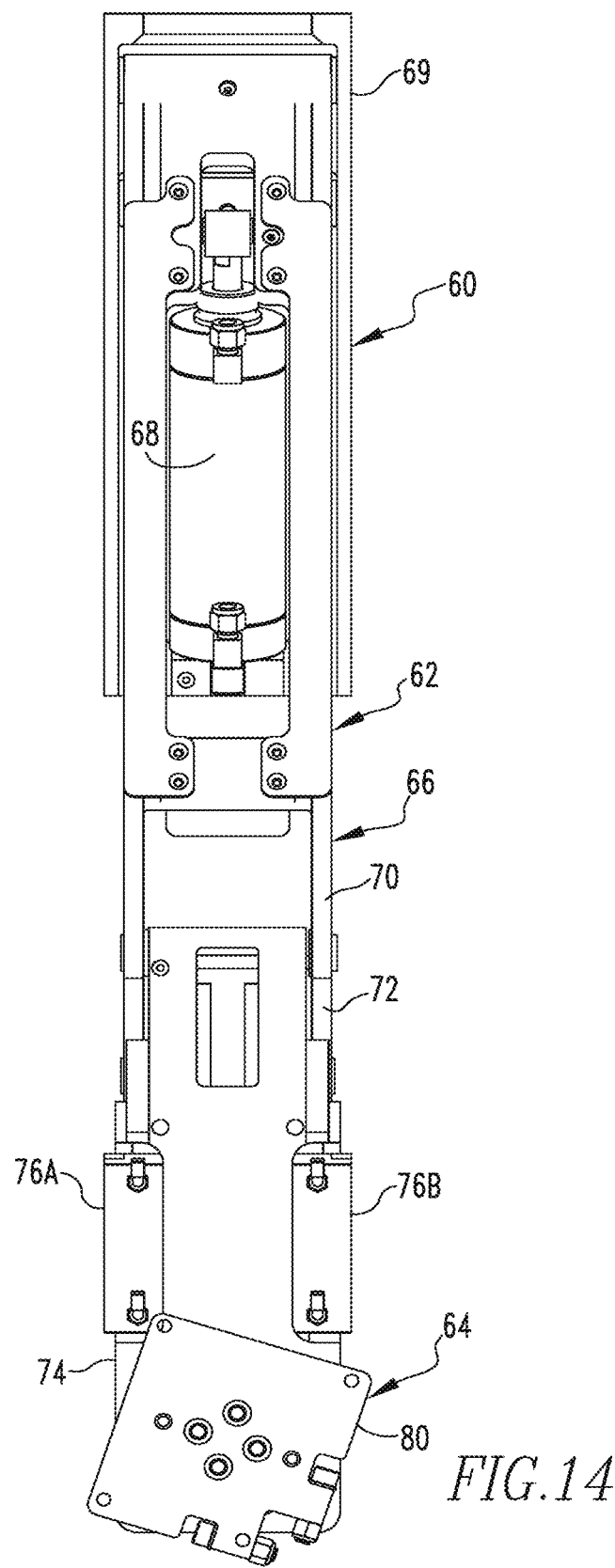
FIG. 14 is a front elevational view of the manipulator apparatus of FIG. 13.
Figure 15:
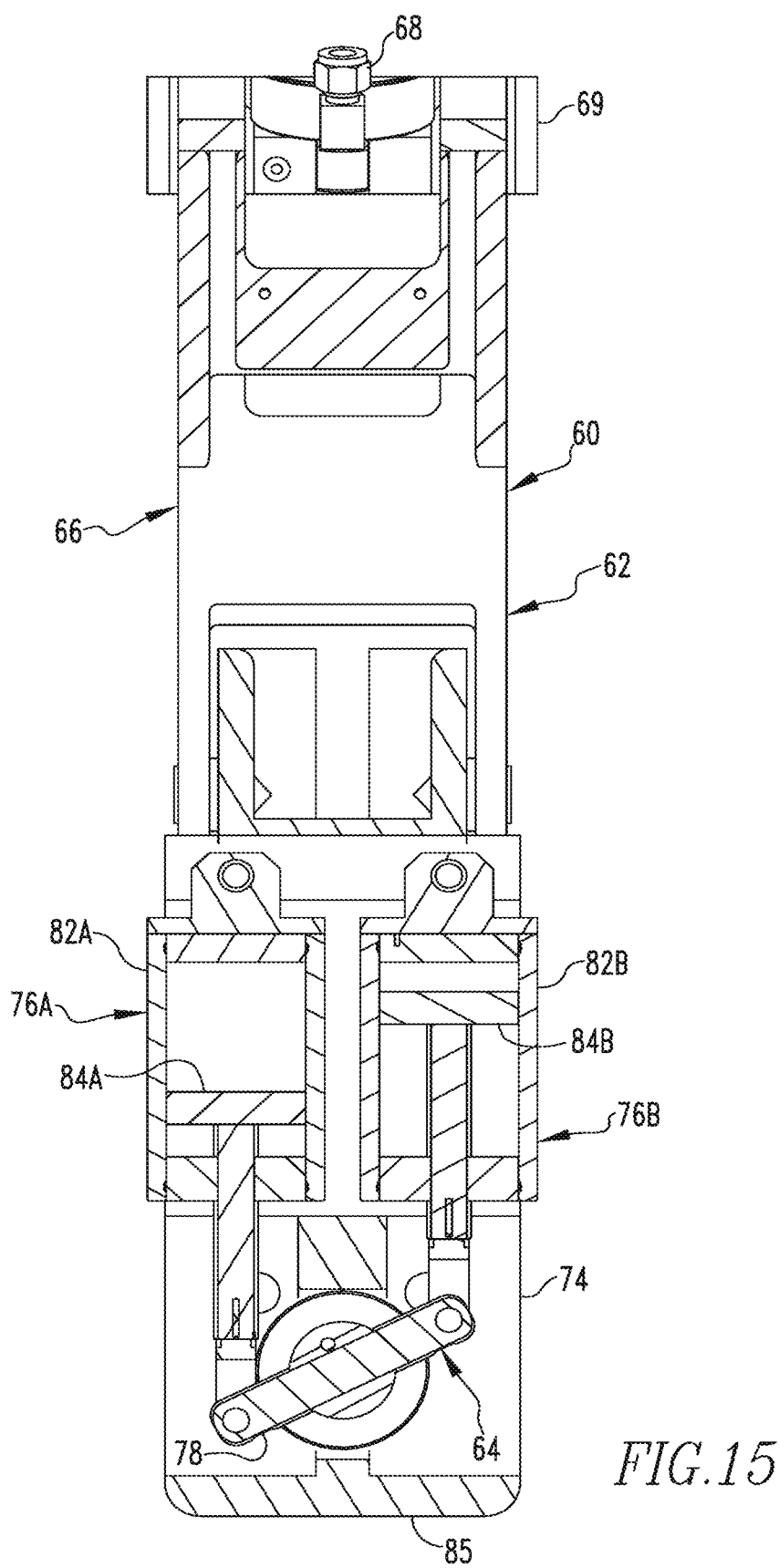
FIG. 15 is a sectional view as taken along line 15-15 of FIG. 13.

As can be understood from FIGS. 13-15, by way of example, the rotation apparatus 64 is situated on the body 74. The rotation apparatus 64 can be said to include a pair of actuators that are indicated generally at the numerals 76A and 76B, and which can be collectively or individually referred to herein with the numeral 76. The rotation apparatus 64 further includes a crank 68 that is pivotally situated on the body 74 and a base 80 that is situated on the crank 78. The actuators 76A and 76B each include a cylinder 82A and 82B, respectively, which serves as a stationary portion that is mounted to the body 74. The actuators 76A and 76B further each include a piston 84A and 84B, respectively, which serves as an effector that is movable along a telescoping direction with respect to the corresponding cylinder 82A and 82B. The pistons 84A and 84B are operatively connected with the crank 78. As can be understood from FIG. 15, the telescoping direction of the actuator 76A is substantially parallel with the telescoping direction of the actuator 76B, and vice versa. The telescoping direction of the actuators 76 thus can be said to be substantially parallel with one another. Moreover, the actuators 76A and 76B are situated side by side. In this regard, it can be seen that the manipulator apparatus 68 includes a free end 85 that is situated at an end of the body 74 opposite the connections with the first and second links 70 and 72. The base 80 is situated adjacent the free end 85, and the actuators 76 both extend away from the crank 78 in a direction that is also away from the free end 85. It can be understood from FIG. 15 that rotation of the base 80 with respect to the body 74 is caused by the extension of one of the actuators 76 simultaneously with the contraction of the other of the actuators 76, which results in a coupling of two opposite forces being applied to opposite ends of the crank 78 simultaneously. The advantageous positioning and coincident actuation of the actuators 76 enables the free end 85 of the body 74 to be situated extremely close to the base 80, which advantageously enables the device 6 to have a desirably long reach along the axis of elongation 34 from the stand 69, as will be set forth in greater detail below.

As can be understood from FIGS. 1, 16, and 17, by way of example, the tool 4 further includes a reciprocation apparatus 86 that is situated on the base 80 of the rotation apparatus 64. More specifically, the reciprocation apparatus 86 can be said to include a platform 88 that is situated on the base 80 and to further include a support 90 that is movably situated on the platform 88. The platform 88 can be said to include a first side 91A and a second side 91B opposite one another. The reciprocation apparatus 86 further includes a belt 92 that extends between the platform 88 and the support 90 and a mount 94 that is situated on the support 90 and which includes, for example, a Gimbal apparatus that is interposed between the support 90 and the device 6. The reciprocation apparatus 86 further includes a drive mechanism 96 that operatively extends between the platform 88 and the support 90.

The reciprocation apparatus 86 further includes a plurality of retention wheels 98 that are rotatably situated on the platform 88 and that are engaged with the support 90. In the depicted exemplary embodiment, the retention wheels 98 are in two pairs, with one pair of the retention wheels 98 movably engaging and retaining therebetween a first portion of the support 90, and with the other pair of retention wheels 98 movably engaging and retaining therebetween another portion of the support 90. In a like fashion, the mount 94 includes a set of four positioning wheels 99 that are rotatably situated thereon and that are similarly arranged in pairs that are disposed at opposite sides of the support 90 and that engage therebetween two different portions of the support 90.

More specifically regarding the support 90, it can be seen that the support 90 includes an elongated flange 100 that is elongated along an arcuate path of fixed radius and that is concave with respect to the platform 88, meaning that the radius of curvature of the flange 100 is in the same direction from the flange 100 as the direction in which the platform 88 is situated with respect to the flange 100. The flange 100 has a first end 101A and a second end 101B opposite one another. The first end 101A extends from the flange 100 in a direction generally away from the first side 91A of the platform 88, and the second end 101B extends from the flange 100 in a direction generally away from the second side 91B of the platform 88. The support 90 further includes a toothed rack 102 that is formed on the flange 100 and that includes a plurality of teeth that are engaged by the drive mechanism 96 to move the mount 94 among a plurality of positions with respect to the manipulator apparatus 60.

For example, FIGS. 1, 3, and 19-20 depict what could be characterized as a centered position of the reciprocation apparatus 86 which, in the depicted exemplary embodiment, is wherein the mount 94 is situated as close as possible to the platform 88, wherein the mount 94 is situated centrally on the flange 100 an equal distance between the first and second ends 101A and 101B, and wherein the mount 94 overlies the platform 88. FIGS. 5-8 and 16 depict one extreme position of the reciprocation apparatus wherein the support 90 and the mount 94 (and thus the device 6) are situated as far as possible in one circumferential direction away from the frame 32. In the position of FIGS. 5-8, the first end 101A of the flange 100 is situated at a location spaced relatively farther away from the first side 91A of the platform 88 than the second end 101B of the flange 100 is spaced away from the second side 91B of the platform 88. In a like fashion, FIG. 17 depicts another extreme position of the reciprocation apparatus with respect to the manipulator apparatus 60 wherein the platform 90 and the mount 94 (and thus the device 6) are situated as far as possible in an opposite circumferential direction away from the manipulator apparatus 60. In the position of FIG. 17, the first end 101A of the flange 100 is situated at a location spaced relatively closer to the first side 91A of the platform 88 than the second end 101B of the flange 100 is spaced away from the second side 91B of the platform 88. That is, in FIG. 17 the second end 101B of the flange 100 is spaced farther away from the second side 91B of the platform 88 than the first end 101A of the flange 100 is spaced from the first side 91A of the platform 88. FIG. 21 depicts an intermediate position intermediate the centered position of FIG. 19, for example, and the one extreme position of FIG. 16, by way of example. It is understood that the reciprocation apparatus 86 is continuously movable among all positions between the one extreme position of FIG. 16, for instance, and the other extreme position of FIG. 17, by way of example, in order to move the mount 94 and thus the device 6 along the circumferential direction 19 between the two extreme positions represented by FIGS. 16 and 17.

As can be seen in FIGS. 19 and 21, for example, the belt 92 has two locations of affixation that are indicated at the numerals 104A and 104B and which cause the belt 92 to form a closed loop that extends around a pair of pulleys indicated at the numerals 105A and 105B that are situated adjacent the opposite ends 101A and 101B of the flange 100. The belt 92 further has an additional location of affixation 104C wherein the belt 92 is affixed at approximately its midpoint to the platform 88.

As can be understood from FIG. 22, the drive mechanism 96 includes a motor 106 situated on the platform 88 from which extends a shaft 108 and that is connected with a gear train 110 via an intermediate bevel drive 112. The gear train 110 includes a drive gear 114 that is toothed and that toothedly engages the rack 102 of the support 90. When the motor 106 is energized or is otherwise caused to have its shaft 108 rotate, the resulting movement of the drive gear 114 causes the support 90 to move with respect to the platform 88 since the platform 88 is affixed to the base 80 of the manipulator apparatus 60. Since the belt 92 is affixed at the location of affixation 104C to the platform 88, movement of the support 90, such as is indicated in FIG. 21, in a direction away from the centered position of FIG. 19 toward the one extreme position of FIG. 16 results in the tension in the belt 92 applying a force at the location of affixation 104A to the mount 94. Such force causes the mount 94 to move with its positioning wheels 99 along the longitudinal extent of the support 90 toward the first end 101A of the flange 100. Such movement of the mount 94 can also be said to be generally away from the first side 91A of the platform 88.

For each incremental distance of movement of the support 90 with respect to the platform 88 along the circumferential direction 19, the mount 94 moves twice as far with respect to the platform 88 along the circumferential direction 19. This is accomplished by providing the belt 92 to extend about both the concave surface of the flange 100, i.e., the surface upon which the rack 102 is formed, and the convex surface of the flange 100 that is opposite thereto. For example, if the support 90 moves one inch along the circumferential direction 19 to the left of FIG. 21, this results in a portion of the belt 92 being pulled a distance of one inch at each of the concave and convex surfaces of the support 90, and since the belt 92 is affixed to the platform 88 at the location of affixation 104C, the mount 94 is thereby caused to move a total of one inch+one inch=two inches along the circumferential direction 19 in the leftward direction from the perspective of FIG. 21. The distance along the circumferential direction 19 that is traversed by the mount 94 in going between the extreme positions of FIGS. 16 and 17 is far greater than the length of the support 90 along the circumferential direction. While a certain portion of the support 90 must remain affixed between the pairs of retention wheels 98 on the platform 88, the geometry presented herein permits the mount 94 and thus the device 6 situated thereon to move through a distance along the circumferential direction 19 that is nearly twice the length of the support 90 along the circumferential direction 19. Moreover, the provision of the drive mechanism 96 in combination with the arrangement of the belt 92 enables the drive mechanism 96 to drive both the support 90 and the mount 94 with only a single drive mechanism 96.

In order to receive the tool 4 into the BWR 10 for use therein, the manipulator apparatus 60 is first placed into its retracted position, such as is depicted generally in FIGS. 9-12. As can be understood from FIGS. 9-12, the reciprocation apparatus 86 and the device 6 mounted thereon are situated fully within the receptacle 44 when in the retracted position, thereby permitting the tool 4 to be longitudinally received in one of the fuel cells 22. In the retracted position, the longitudinal extent of the support 90 is generally aligned with the axis of elongation 34. The manipulator apparatus 60 is typically retained in the retracted position until the feet 38 have engaged the sockets 24 of the fuel cell 22 in which the tool 4 is received. Thereafter, the driver 68 can be operated, i.e., lengthened in the depicted exemplary embodiment, to move the manipulator apparatus 60 from the retracted position of FIGS. 9-12 to an extended position wherein the support 90 is situated at the exterior of the receptacle 44 with the longitudinal extent of the support 90 remaining generally aligned with the axis of elongation 34. Further thereafter, the actuators 76 of the rotation apparatus 64 can be operated to pivot the reciprocation apparatus 86 between the extended position and a deployed position wherein the support 90 has been rotated by the rotation apparatus 64 such that its longitudinal extent lies approximately transverse to the axis of elongation 34, such as is depicted generally in FIG. 4.

In so doing, it may also be necessary to energize or otherwise actuate the motor 42 of the foot apparatus 36 to cause the frame 32 to be pivoted about its axis of elongation 30 with respect to the feet 38, such as is depicted generally in FIG. 2, in order to cause the arcuate profile of the platform 88 to become aligned with the arcuate profile of the interior surface 14 of the shroud 12. In this regard, it can be understood that the operation of the manipulator apparatus 60 and the pivot mechanism 40 between the position of FIGS. 9-12 and the position of FIG. 2 can be accomplished in generally any order so long as the driver 68 has been operated sufficiently that the support 90 is situated outside the receptacle 44. For instance, in a given situation it may be desirable to operate the pivot mechanism 40 first to cause the frame 32 to be oriented in the position depicted generally in FIG. 2, after which the driver 68 will be operated to cause the platform 90 to be fully situated outside the receptacle 44 while not yet being fully situated closely adjacent the interior surface 14. The rotation apparatus 64 may then be energized or otherwise operated to cause the base 80 to be rotated approximately 90 degrees to cause the support 90 to be oriented such that its longitudinal extent is oriented generally transverse to the axis of elongation 34. After this, the driver 68 can be further operated to advance the support 90 relatively closer to the interior surface 14 until the position that is depicted generally in FIG. 2 is achieved. It thus can be understood that such operations can occur in generally any order in order to achieve the positioning of FIG. 2 so long as the support 90 is in the extended position situated outside the receptacle 44 prior to the rotation apparatus 44 being energized or otherwise operated.

Figure 4:
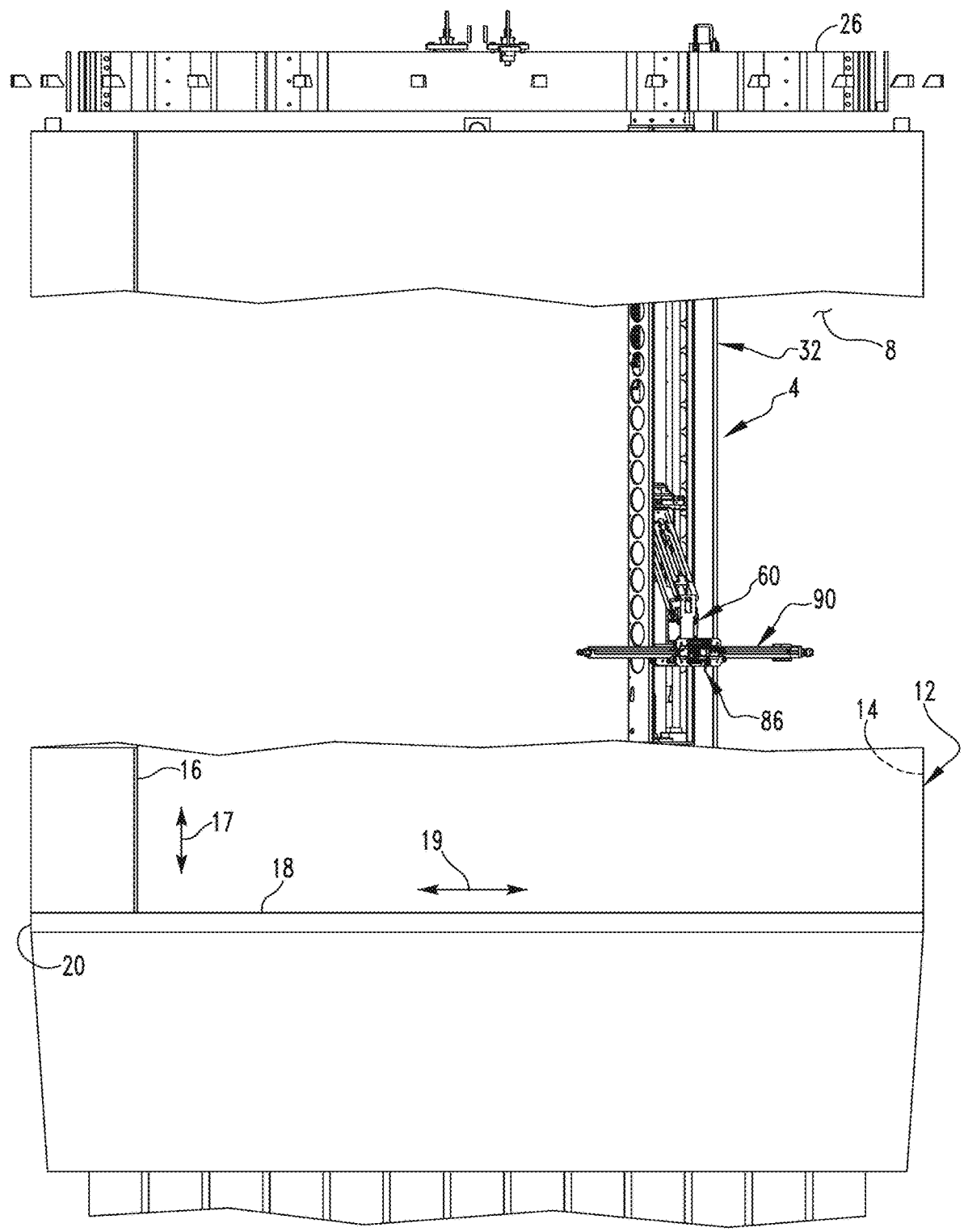
FIG. 4 is an elevational view of the tool of FIG. 1 received in the boiling water reactor of FIG. 2 and with the manipulator apparatus being depicted in a second configuration on the tool.

FIG. 2 depicts the same centered position of the reciprocation apparatus 86 as FIGS. 1, 3, and 4, by way of example. By energizing or otherwise operating the drive mechanism 96, the reciprocation apparatus 86 can be caused to move from the centered position and between the extreme positions of FIGS. 16 and 17, which thereby causes the mount 94 and thus the device 6 situated thereon to be moved along the circumferential direction 19 between a plurality of different positions along the interior surface 14, i.e., along the circumferential direction 19 at a given vertical height from the perspective of FIG. 4. Once the reciprocation apparatus 86 has moved between the two extreme positions of FIGS. 16 and 17, for example, the elevator apparatus 52 can be energized or otherwise operated to move the manipulator apparatus 60 and thus the reciprocation apparatus 86 and the mount 94, as well as the device 6 mounted on the mount 94, to a vertically different position vertically above or below, from the perspective of FIG. 4, the previous vertical position.

For example, the tool 4 may be initially deployed in the position depicted in FIGS. 2 and 4 with respect to the shroud 12, i.e., with the free end 85 extending from the stand 69 in a direction toward the feet 38, which is in a downward direction from the perspective of FIGS. 2 and 4, and which can be referred to as a second configuration of the manipulator apparatus 60. The elevator apparatus 52 may be operated to progressively move the reciprocation apparatus 86 in the downward axial direction 17 after each traversal by the reciprocation apparatus 86 between the extreme circumferential positions such as are depicted in FIGS. 16 and 17. Such circumferential movement alternately followed by axial movement results in the reciprocation apparatus 86 and thus the device 6 moving along successive circumferential sectors of the interior surface 14 moving in, for instance, a downward direction to eventually inspect a large circumferential sector of the shroud 12 extending from the position depicted generally in FIG. 4 downward to the horizontal weld 18.

Figure 6:
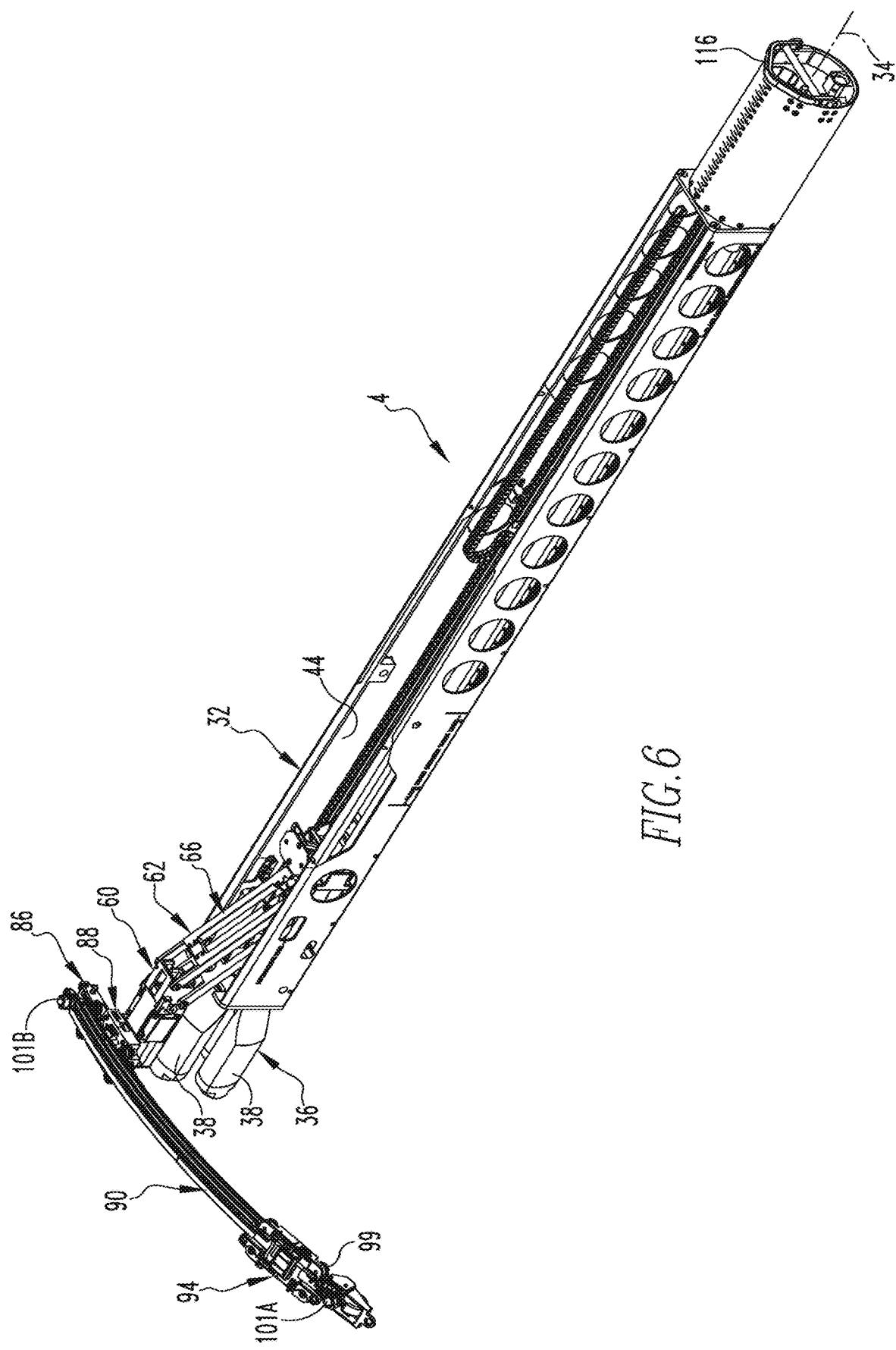
FIG. 6 is a view similar to FIG. 5, except depicting the manipulator apparatus at a different position along the longitudinal extent of the tool and depicting the reciprocation apparatus situated at a location beyond a frame of the tool and situated adjacent a foot apparatus of the tool.
Figure 7:
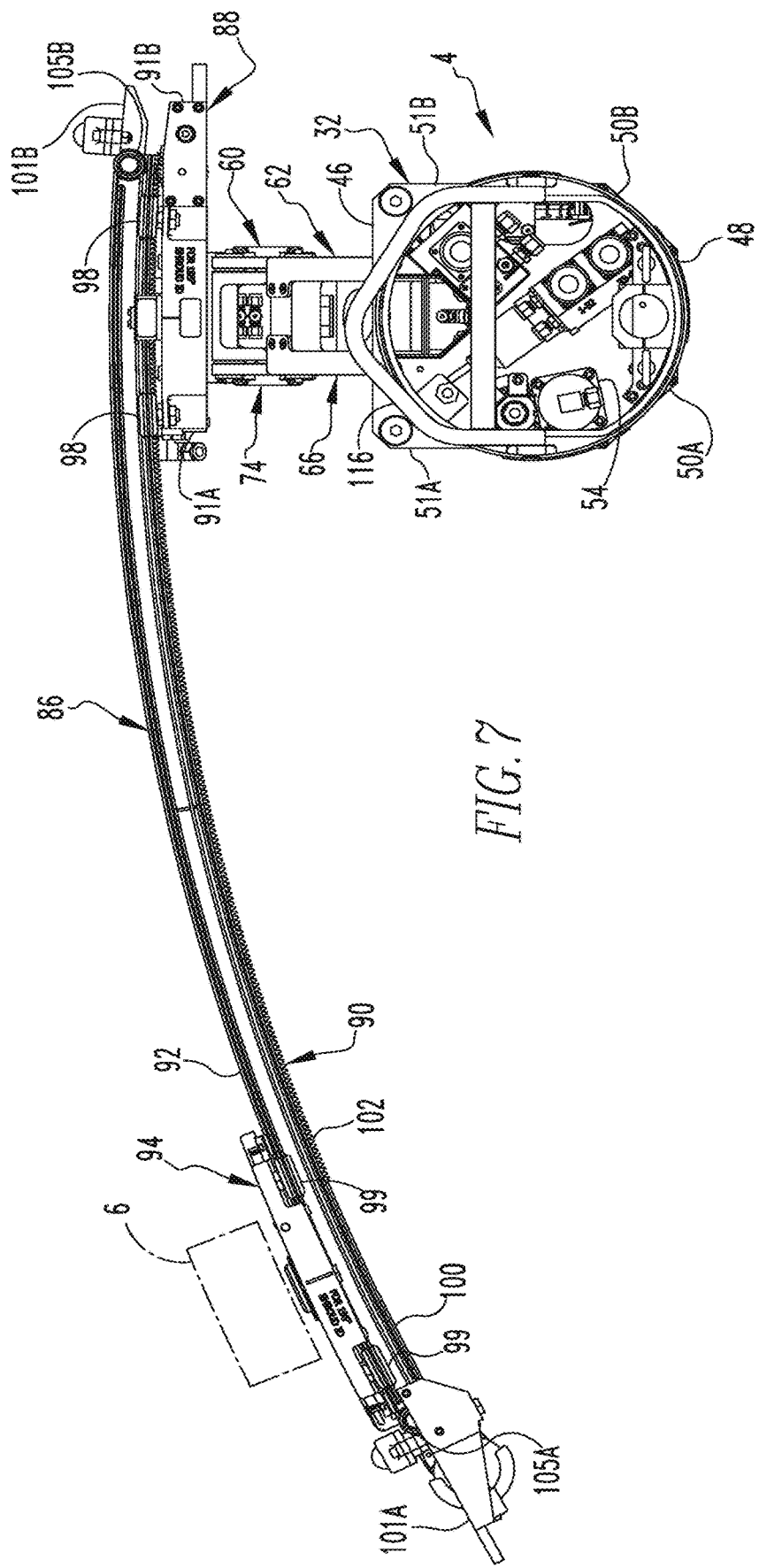
FIG. 7 is a view similar to FIG. 6, except depicting a top plan view of the tool.

In this regard, it can be understood from FIG. 6 that the positioning of the manipulator apparatus 60 on the elevator apparatus 52 such that its free end 85 extends from the stand 69 in a direction generally toward the feet 38 enables the reciprocation apparatus 86 and thus the device 6 to be moved to an extremely low vertical position along the shroud 12. This enables inspection of the horizontal weld 18, by way of example. The tool 4 can thereafter be removed from the fuel cell 22 and the tool 4 can be partially disassembled to reorient the manipulator apparatus 60 on the elevator apparatus 52 in a first configuration, such as is depicted generally in FIG. 1, wherein the free end 85 of the manipulator apparatus 60 extends from the stand 69 in a direction generally away from the feet 38. The first and second configurations mentioned herein are not intended to suggest any particular order of operation.

Repositioning the tool 4 in the fuel cell 22 with the manipulator apparatus 60 having been reoriented to be in the second configuration, such as is depicted generally in FIG. 1, enables the elevator apparatus 52 to be operated to cause the manipulator apparatus 60 and thus the reciprocation apparatus 86 and the device 6 to be moved vertically very high along the axial direction 17 to enable inspection of the shroud 12 in a region adjacent the top guide 26. By enabling the manipulator apparatus 60 to be switchable between the two configurations of FIG. 1 and FIG. 5, for example, the manipulator apparatus 60 is alternately positioned to enable the entire vertical extent of the shroud 12 to be accessible by the device 6, such as for inspection or for other purposes. It is reiterated that operation of the reciprocation apparatus 86 enables a wide swath along the circumferential direction 19 that is nearly twice the length of the support 90 along the circumferential direction 19 to be accessed by the mount 94 and thus the device 6 for purposes of inspection or otherwise while the tool 4 is received in a given fuel cell 22. A bail 116 situated at the top of the frame 32 enables the tool 4 to be connected with a lifting mechanism that lowers the tool into the relevant fuel cell 22 and removes the tool 4 therefrom.

It can be understood that the computer system 28 is operable to perform all of the operations set forth above and to control the device 6, such as by detecting ultrasonic data therefrom during a testing operation or to otherwise control a different type of device 6 that otherwise interacts with the shroud 12. The configuration of the tool 4 and the reciprocation apparatus 86 thus advantageously enable rapid access to the interior surface 14 of the shroud 12 which enables inspection or other operations to be rapidly performed thereon. Other advantages will be apparent.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof

What is claimed is:

1. A reciprocation apparatus that is structured to be mounted to a tool which is receivable into an interior region of a core shroud of a boiling water reactor, the reciprocation apparatus further being structured to carry a device thereon into the interior region, the reciprocation apparatus comprising:
 a platform that is structured to be situated on the tool and that has a first side and a second side opposite one another;
 a support that is elongated and that is situated on the platform, the support having a first end and a second end opposite one another, the support being movable along its direction of elongation with respect to the platform in a first direction wherein the first end moves relatively farther away from the first side, the support further being movable in a second direction opposite the first direction wherein the second end moves relatively farther away from the second side;
 a belt that is elongated and flexible, the belt being affixed at one or more locations along its length to the platform to form a closed loop that extends about at least a portion of the support and that permits relative movement between the belt and the at least portion of the support when the support moves in the first and second directions;
 a mount that is situated on the belt and that is structured to carry the device;
 a drive mechanism operationally extending between the support and one of the platform
 and the belt, the drive mechanism being operable to move the reciprocation apparatus between a first state of the reciprocation apparatus and a second state of the reciprocation apparatus;
  in the first state, a relatively greater portion of the support extends from the first side than extends from the second side, and the mount is situated relatively closer to the first end than the second end; and
  in the second state, a relatively greater portion of the support extends from the second side than extends from the first side, and the mount is situated relatively closer to the second end than the first end.

2. The reciprocation apparatus of claim 1 wherein the support is elongated along an arcuate path that is of a fixed radius.

3. The reciprocation apparatus of claim 1 wherein the belt extends around a first location adjacent the first end and further extends around a second location adjacent the second end, and wherein relative movement occurs between the belt and the first and second locations when the reciprocation apparatus moves between the first state and the second state.

4. The reciprocation apparatus of claim 3 wherein the drive mechanism operationally extends between the support and the platform.

5. The reciprocation apparatus of claim 4 wherein the support includes a toothed rack, and wherein the drive mechanism operationally extends between the toothed rack and the platform.

6. The reciprocation apparatus of claim 5 wherein the mount is affixed to the belt, and wherein operation of the drive mechanism causes movement of the support relative to the platform which, in turn, causes the relative movement between the belt and the first and second locations when the reciprocation apparatus moves between the first state and the second state.

\* \* \* \* \*